(12) United States Patent
Hakozaki

(10) Patent No.: US 12,365,305 B2
(45) Date of Patent: Jul. 22, 2025

(54) GAS GENERATOR

(71) Applicant: NIPPON KAYAKU KABUSHIKI KAISHA, Tokyo (JP)

(72) Inventor: Tomohiro Hakozaki, Tokyo (JP)

(*) Notice: Subject to any disclaimer, the term of this patent is extended or adjusted under 35 U.S.C. 154(b) by 0 days.

(21) Appl. No.: 18/256,054

(22) PCT Filed: Dec. 28, 2021

(86) PCT No.: PCT/JP2021/048894
§ 371 (c)(1),
(2) Date: Jan. 11, 2024

(87) PCT Pub. No.: WO2022/158276
PCT Pub. Date: Jul. 28, 2022

(65) Prior Publication Data
US 2024/0132011 A1    Apr. 25, 2024

(30) Foreign Application Priority Data

Jan. 22, 2021 (JP) ................................. 2021-009167

(51) Int. Cl.
| | | |
|---|---|---|
| *B60R 21/264* | (2006.01) | |
| *B60R 21/217* | (2011.01) | |
| *B60R 21/26* | (2011.01) | |

(52) U.S. Cl.
CPC ........ *B60R 21/2644* (2013.01); *B60R 21/217* (2013.01); *B60R 2021/26029* (2013.01); *B60R 2021/2648* (2013.01)

(58) Field of Classification Search
CPC .............. B60R 21/2644; B60R 21/217; B60R 2021/2648; B60R 21/26
See application file for complete search history.

(56) References Cited

FOREIGN PATENT DOCUMENTS

| | | |
|---|---|---|
| EP | 1491849 A1 | 12/2004 |
| JP | 2004217059 A | 1/2003 |
| JP | 2003-285714 A | 10/2003 |

(Continued)

OTHER PUBLICATIONS

Aoyagi, WO-2011142395-A1, Machine Translation of Specification (Year: 2011).*

(Continued)

*Primary Examiner* — Drew J Brown
*Assistant Examiner* — Matthew Joseph Ganci
(74) *Attorney, Agent, or Firm* — Patshegen IP; Moshe Pinchas

(57) ABSTRACT

A gas generator includes a housing accommodating a gas generating agent inside, an igniter including a cup-shaped member including an enhancer chamber, in which a thin weak member is disposed on a part of a top wall portion of the cup-shaped member, a side wall portion of the cup-shaped member having a mechanical strength higher than a mechanical strength of the weak member. The side wall portion of the cup-shaped member includes a thin portion provided close to the top wall portion, and a thick portion extending from the thin portion, the weak member has a mechanical strength to rupture the cup-shaped member prior to the side wall portion in accordance with activation of the igniter, and the thin portion has a mechanical strength to rupture, deform, or melt when rupture in the weak member progresses to the thin portion.

7 Claims, 11 Drawing Sheets

(56) References Cited

FOREIGN PATENT DOCUMENTS

| | | | |
|---|---|---|---|
| JP | 2012-40943 A | 3/2012 | |
| JP | 202093610 A | 6/2020 | |
| JP | 2020179683 A * | 11/2020 | |
| WO | WO-2011142395 A1 * | 11/2011 | ......... B60R 21/2644 |
| WO | 2017138612 A1 | 8/2017 | |

OTHER PUBLICATIONS

Hakosaki, JP-2020179683-A, Machine Translation of Specification (Year: 2020).*
ISR; Japan Patent Office; Tokyo; Mar. 8, 2022.
EPO Search Report; Nov. 29, 2024.
JP2021-009167; Office Action; Jan. 6, 2025.

* cited by examiner

GAS GENERATOR

TECHNICAL FIELD

The present invention relates to a gas generator incorporated in an occupant protector that protects an occupant in an event of collision of a vehicle or the like, and particularly to a gas generator incorporated in an airbag device mounted on an automobile or the like.

BACKGROUND ART

Conventionally, an airbag device which is an occupant protector has been widely used from the viewpoint of protecting an occupant of an automobile or the like. The airbag device is provided for the purpose of protecting an occupant from an impact generated at a time of collision of a vehicle or the like, and instantly inflates and deploys an airbag at the time of collision of the vehicle or the like, and thus the airbag serves as a cushion to receive the body of the occupant.

A gas generator is a device that is incorporated in the airbag device, ignites an igniter by energization from a control unit at the time of collision of the vehicle or the like, causes a gas generating agent to combust by flame generated in the igniter to instantaneously generate a large amount of gas, and inflates and deploys the airbag.

There are gas generators having various structures. As a gas generator that can be particularly suitably used for a driver seat side airbag device, a passenger seat side airbag device, and the like, there is a short substantially cylindrical disk-type gas generator having a relatively large outer diameter.

The disk-type gas generator has a short substantially cylindrical housing in which both ends in an axial direction are closed, a plurality of gas ejection ports is provided in a circumferential wall portion of the housing, an enhance agent is accommodated in the housing so as to face an igniter assembled to the housing, a gas generating agent is filled in the housing so as to surround the enhance agent, and a filter is accommodated in the housing so as to further surround a periphery of the gas generating agent.

For example, JP 2004-217059 A (Patent Literature 1) discloses a specific configuration of the disk-type gas generator.

Patent Literature 1 discloses a gas generator in which a cup body filled with an enhance agent and an igniter collar holding an igniter body are fixed by caulking at a lower end bent portion of a crimp case. The cup body includes metal such as aluminum, has a weak member on at least one of a closed end surface or a circumferential wall portion. Since the cup body is easily ruptured at the weak member, a pressure applied to the crimp case is reduced, and as a result, the crimp case is prevented from falling off or being damaged. However, since the cup body includes aluminum of a thin plate, there is a problem that a mechanical strength is low and a rupture strength of the cup body cannot be increased when the enhance agent combusts.

CITATION LIST

Patent Literature

Patent Literature 1: JP 2004-217059 A

SUMMARY OF INVENTION

Technical Problems

In order to sufficiently cause the enhance agent to combust, it is necessary to increase an internal pressure of the cup body to improve a combustion speed of the enhance agent. Then, the gas generating agent in the gas generator can efficiently combust in a short time, and gas can be ejected to the airbag. However, in general, when the mechanical strength of the cup body (cup-shaped member) is increased, adverse effects such as restriction of rupture (breakage), deformation, or melting of the cup body, and deterioration of output characteristics of generated gas due to an unstable size of rupture (breakage) of the cup body are likely to occur. That is, in general, there is a trade-off relationship between increasing the mechanical strength of the cup body and controlling the size of rupture (breakage) of the cup body (making a breakage region uniform).

Therefore, the present invention has been made to solve the above-described problems, and an object of the present invention is to provide a gas generator that can control a size of rupture of a cup body to be stabilized (make a breakage region uniform) while increasing a mechanical strength of the cup body.

Solutions to Problems (1) A gas generator of the present invention includes a housing having a short cylindrical shape, including a cylindrical circumferential wall portion provided with a gas ejection port, a top plate portion that closes one end in an axial direction of the cylindrical circumferential wall portion, and a bottom plate portion that closes the other end in the axial direction of the cylindrical circumferential wall portion, and including a combustion chamber that accommodates a gas generating agent inside, an igniter that is assembled to the bottom plate portion and includes an ignition portion accommodating an ignition charge that ignites at the time of activation, and a cup-shaped member including an enhancer chamber that accommodates an enhance agent inside, disposed to protrude toward the combustion chamber such that a space inside the enhancer chamber faces the ignition portion, and including a single bottomed cylindrical member, in which a thin weak member is disposed on at least a part of a top wall portion of the cup-shaped member, a side wall portion of the cup-shaped member is provided, the side wall portion having a mechanical strength higher than a mechanical strength of the weak member partitioning the enhancer chamber and the combustion chamber, the side wall portion includes a thin portion provided close to the top wall portion, and a thick portion extending from the thin portion to a side opposite to the top wall portion along the axial direction, the weak member is disposed to face the ignition portion and has a mechanical strength to rupture, deform, or melt the cup-shaped member prior to the side wall portion in accordance with activation of the igniter, and the thin portion has a mechanical strength to rupture, deform, or melt when rupture, deformation, or melting in the weak member progresses to the thin portion.

(2) In the gas generator according to (1), the weak member disposed on the top wall portion of the cup-shaped member is preferably thinner than the side wall portion of the cup-shaped member.

(3) In the gas generator according to (1) or (2), the top wall portion of the cup-shaped member preferably includes a weak member existing region where rupture, deformation, or melting initially occurs with the weak member as a starting point due to combustion of the enhance agent along with activation of the igniter, and a weak member non-existing region where rupture, deformation, or melting occurs after a lapse of a predetermined time after the weak member existing region deforms.

(4) In the gas generator according to (1), the weak member preferably has a slit shape provided radially from a center in the top wall portion.

(5) In the gas generator according to (1), the cup-shaped member preferably includes a metal or an alloy.

(6) The gas generator according to (1) preferably further includes a filter provided inside the housing over a circumferential direction of the housing, and a support member including a base portion having an annular plate shape and provided in a direction along an inner bottom surface of the bottom plate portion, an abutment portion abutting on an inner peripheral surface of an end of the filter close to the bottom plate portion, and an erected portion having a cylindrical shape and erected from the base portion toward the top plate portion, in which the support member is held by the cup-shaped member by press-fitting the erected portion into the thick portion of the cup-shaped member.

(7) The gas generator according to (1) preferably further includes a filter provided inside the housing over a circumferential direction of the housing, in which the cup-shaped member further includes a base portion having an annular plate shape and provided in a direction along an inner bottom surface of the bottom plate portion, an abutment portion abutting on an inner peripheral surface of an end of the filter close to the bottom plate portion, and an erected portion having a cylindrical shape and erected from the base portion toward the top plate portion, and the erected portion is integrally extended from the side wall portion of the cup-shaped member.

Advantageous Effects of Invention

The present invention enables a gas generator to control a size of rupture of a cup body to be stabilized (make a breakage region uniform) while increasing a mechanical strength of the cup body. Since the size of rupture of the cup body is stabilized (a breakage region becomes uniform), the gas generator can exhibit predetermined performance while the amount of the enhance agent can be reduced.

DESCRIPTION OF EMBODIMENT

Figure 1:
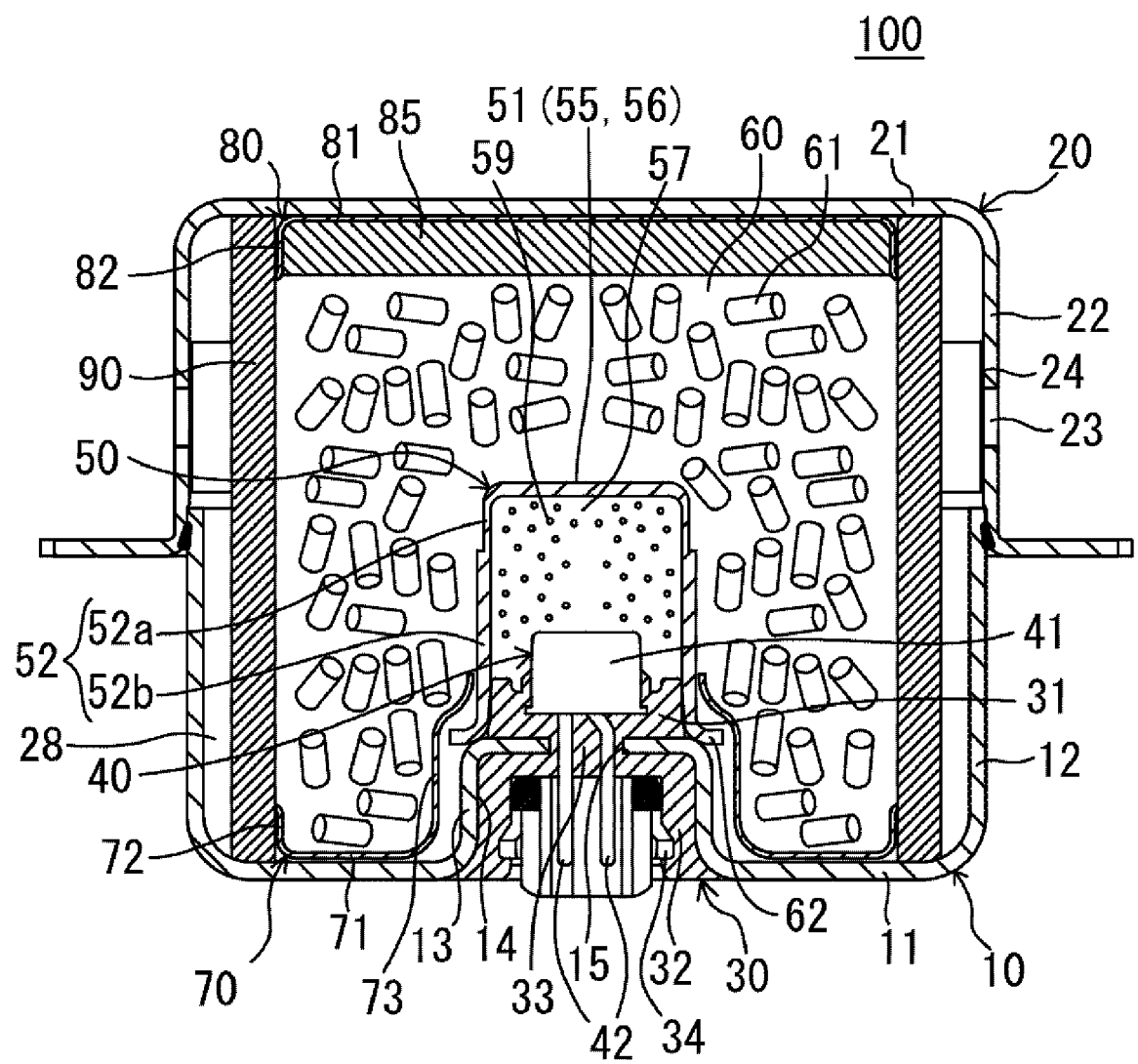
FIG. 1 is a schematic sectional view of a disk-type gas generator according to an embodiment of the present invention.

Hereinafter, an embodiment of the present invention will be described with reference to the drawings. In the following embodiment, the present invention is applied to a disk-type gas generator suitably incorporated in an airbag device mounted on a steering wheel or the like of an automobile. In the following embodiment, the same or common parts are denoted by the same reference signs in the drawings, and the description thereof will not be repeated.

FIG. 1 is a schematic sectional view of a disk-type gas generator 100 according to the embodiment of the present invention. First, a configuration of the disk-type gas generator 100 according to the present embodiment will be described with reference to FIG. 1.

As shown in FIG. 1, the disk-type gas generator 100 has a short substantially cylindrical housing in which one end and the other end in an axial direction are closed, and a holder 30, an igniter 40, a cup-shaped member 50, an enhance agent 59, a gas generating agent 61, a lower support member 70, an upper support member 80, a cushion material 85, a filter 90, and the like as internal components are accommodated in an accommodation space provided inside the housing. In addition, a combustion chamber 60 in which the gas generating agent 61 among the above-described internal components is mainly accommodated is located in the accommodation space provided inside the housing.

The housing includes a lower shell 10 and an upper shell 20. Each of the lower shell 10 and the upper shell 20 includes, for example, a press-molded product formed by pressing a rolled metal plate member. As the metal plate member constituting the lower shell 10 and the upper shell 20, for example, a metal plate including stainless steel, steel, aluminum alloy, stainless alloy, or the like is used, and preferably, a so-called high-tensile steel plate in which damage such as breakage does not occur even when a tensile stress of 440 [MPa] or more and 780 [MPa] or less is applied is used.

Each of the lower shell 10 and the upper shell 20 has a bottomed substantially cylindrical shape, and opening surfaces of the shells are combined and joined so as to face each other to constitute the housing. The lower shell 10 has a bottom plate portion 11 and a circumferential wall portion 12, and the upper shell 20 has a top plate portion 21 and a circumferential wall portion 22.

An upper end of the circumferential wall portion 12 of the lower shell 10 is press-fitted by being inserted into a lower end of the circumferential wall portion 22 of the upper shell 20. Furthermore, the circumferential wall portion 12 of the lower shell 10 and the circumferential wall portion 22 of the upper shell 20 are joined at or near an abutment portion, and thus the lower shell 10 and the upper shell 20 are fixed. Here, electron beam welding, laser welding, friction welding, or the like can be suitably used for joining the lower shell 10 and the upper shell 20.

Thus, a part of the circumferential wall portion of the housing closer to the bottom plate portion 11 is configured by the circumferential wall portion 12 of the lower shell 10, and a part of the circumferential wall portion of the housing closer to the top plate portion 21 is configured by the circumferential wall portion 22 of the upper shell 20. One end and the other end of the housing in the axial direction are closed by the bottom plate portion 11 of the lower shell 10 and the top plate portion 21 of the upper shell 20, respectively.

A protruding cylindrical portion 13 protruding toward the top plate portion 21 is provided at a center of the bottom plate portion 11 of the lower shell 10, and thus a recess 14 is formed at the center of the bottom plate portion 11 of the lower shell 10. The protruding cylindrical portion 13 is a portion to which the igniter 40 is fixed with the holder 30 interposed therebetween, and the recess 14 is a portion serving as a space for providing a female connector 34 in the holder 30.

The protruding cylindrical portion 13 has a bottomed substantially cylindrical shape, and an opening 15 having a point-asymmetrical shape (for example, a D shape, a barrel shape, an oval shape, or the like) in a plan view is provided at an axial end located close to the top plate portion 21. The opening 15 is a portion through which a pair of terminal pins 42 of the igniter 40 is inserted.

The igniter 40 is for generating flame, and includes an ignition portion 41 and the pair of terminal pins 42 described above. The ignition portion 41 internally includes ignition charge that ignites and combusts at the time of activation to generate flame, and a resistor for igniting the ignition charge. The pair of terminal pins 42 is connected to the ignition portion 41 in order to ignite the ignition charge.

Specifically, the ignition portion 41 includes a squib cup having a cup shape, and a plug that closes an opening end of the scribe cup and through which the pair of terminal pins 42 is inserted to hold the squib cup. The ignition portion 41 has a configuration in which the resistor (bridge wire) is attached so as to couple tips of the pair of terminal pins 42 inserted into the squib cup, and the ignition charge is loaded in the squib cup so as to surround the resistor or to be close to the resistor.

Here, a nichrome wire or the like is generally used as the resistor, and ZPP (zirconium-potassium-perchlorate), ZWPP (zirconium-tungsten-potassium perchlorate), lead tricinate, or the like is generally used as the ignition charge. Note that the squib cup and the plug described above generally include metal or plastic.

When a collision is detected, a predetermined amount of current flows through the resistor through the terminal pins 42. When a predetermined amount of current flows through the resistor, Joule heat is generated in the resistor, and the ignition charge starts combustion. The high-temperature flame generated by the combustion causes a squib cup storing the ignition charge to rupture. Time until the igniter 40 starts activation after the current flowing through the resistor is generally 2 [ms] or less when a nichrome wire is used for the resistor.

The igniter 40 is attached to the bottom plate portion 11 in a state of being inserted from inside of the lower shell 10 such that the terminal pins 42 are inserted into the opening 15 provided in the protruding cylindrical portion 13. Specifically, the holder 30 including a resin molding portion is provided around the protruding cylindrical portion 13 provided on the bottom plate portion 11, and the igniter 40 is fixed to the bottom plate portion 11 by being held by the holder 30.

The holder 30 is formed by injection molding (specifically, insert molding) using a mold, and is formed by attaching an insulating flowable resin material to the bottom plate portion 11 so as to reach from a part of an inner surface to a part of an outer surface of the bottom plate portion 11 through the opening 15 provided in the bottom plate portion 11 of the lower shell 10 and solidifying the material.

A configuration in which the ignition charge is loaded in the squib cup so as to be in contact is provided.

Here, a nichrome wire or the like is generally used as the resistor, and ZPP (zirconium-potassium-perchlorate), ZWPP (zirconium-tungsten-potassium perchlorate), lead tricinate, or the like is generally used as the ignition charge. Note that the squib cup and the plug described above generally include metal or plastic.

When a collision is detected, a predetermined amount of current flows through the resistor through the terminal pins 42. When a predetermined amount of current flows through the resistor, Joule heat is generated in the resistor, and the ignition charge starts combustion. The high-temperature flame generated by the combustion causes a squib cup storing the ignition charge to rupture. Time until the igniter 40 starts activation after the current flowing through the resistor is generally 2 [ms] or less when a nichrome wire is used for the resistor.

The igniter 40 is attached to the bottom plate portion 11 in a state of being inserted from inside of the lower shell 10 such that the terminal pins 42 are inserted into the opening 15 provided in the protruding cylindrical portion 13. Specifically, the holder 30 including a resin molding portion is provided around the protruding cylindrical portion 13 provided on the bottom plate portion 11, and the igniter 40 is fixed to the bottom plate portion 11 by being held by the holder 30.

The holder 30 is formed by injection molding (specifically, insert molding) using a mold, and is formed by attaching an insulating flowable resin material to the bottom plate portion 11 so as to reach from a part of an inner surface to a part of an outer surface of the bottom plate portion 11 through the opening 15 provided in the bottom plate portion 11 of the lower shell 10 and solidifying the material.

As a raw material of the holder 30 formed by injection molding, a resin material excellent in heat resistance, durability, corrosion resistance, and the like after curing is suitably selected and used. In that case, the thermoplastic resin is not limited to a thermosetting resin typified by an epoxy resin or the like, and a thermoplastic resin typified by a polybutylene terephthalate resin, a polyethylene terephthalate resin, a polyimide resin (for example, nylon 6, nylon 66, or the like), a polypropylene sulfide resin, a polypropylene oxide resin, or the like can also be used. When the above thermoplastic resins are selected as raw material, it is preferable to contain glass fibers or the like as a filler in these resin materials in order to secure a mechanical strength of the holder 30 after molding. However, when sufficient mechanical strength can be secured only by a thermoplastic resin, it is not necessary to add a filler as described above.

The holder 30 includes an inner cover 31 that covers a part of the inner surface of the bottom plate portion 11 of the lower shell 10, an outer cover 32 that covers a part of the outer surface of the bottom plate portion 11 of the lower shell 10, and a coupling portion 33 that is located in the opening 15 provided in the bottom plate portion 11 of the lower shell 10 and is continuous with each of the inner cover 31 and the outer cover 32.

The holder 30 is fixed to the bottom plate portion 11 on a surface of each of the inner cover 31, the outer cover 32, and the coupling portion 33 close to the bottom plate portion 11. The holder 30 is fixed to a side surface and a lower surface of a part near a lower end of the ignition portion 41 of the igniter 40 and a surface of a part near upper ends of the terminal pins 42 of the igniter 40.

As a result, the opening 15 is completely embedded by the terminal pins 42 and the holder 30, sealability at the part is secured, and thus airtightness of the space inside the housing is secured. Since the opening 15 has a point-asymmetric shape in plan view as described above, by embedding the opening 15 with the coupling portion 33, the opening 15 and the coupling portion 33 also function as a whirl-stop mechanism that prevents the holder 30 from rotating with respect to the bottom plate portion 11.

The female connector 34 is formed at a part of the holder 30 facing outside of the outer cover 32. The female connector 34 is a portion for receiving a male connector (not shown) of a harness for connecting the igniter 40 and a control unit (not shown), and is located in the recess 14 provided in the bottom plate portion 11 of the lower shell 10.

In the female connector 34, a portion close to lower ends of the terminal pins 42 of the igniter 40 is disposed to be exposed. The male connector is inserted into the female connector 34 to achieve electrical conduction between a core wire of the harness and the terminal pins 42.

The injection molding described above may be performed by using the lower shell 10 in which an adhesive layer is provided in advance at a predetermined position on the surface of the bottom plate portion 11 of the portion to be covered by the holder 30. The adhesive layer can be formed by applying an adhesive in advance to a predetermined position of the bottom plate portion 11 and curing the adhesive.

In this way, since the cured adhesive layer is located between the bottom plate portion 11 and the holder 30, the holder 30 including the resin molding portion can be more firmly fixed to the bottom plate portion 11. Therefore, if the adhesive layer is annularly provided along a circumferential direction so as to surround the opening 15 provided in the bottom plate portion 11, higher sealability can be secured at the part.

Here, as an adhesive applied to the bottom plate portion 11 in advance, an adhesive containing a resin material excellent in heat resistance, durability, corrosion resistance, and the like after curing as a raw material is suitably used, and for example, an adhesive containing a cyanoacrylate resin or a silicone resin as a raw material is particularly suitably used. In addition to the above resin material, a material containing, as a raw material, a phenolic resin, an epoxy resin, a melamine resin, a urea resin, a polyester resin, an alkyd resin, a polyurethane resin, a polyimide resin, a polyethylene resin, a polypropylene resin, a polyvinyl chloride resin, a polystyrene resin, a polyvinyl acetate resin, a polytetrafluoroethylene resin, an acrylonitrile butadiene styrene resin, an acrylonitrile styrene resin, an acrylic resin, a polyamide resin, a polyacetal resin, a polycarbonate resin, a polyphenylene ether resin, a polybutylene terephthalate resin, a polyethylene terephthalate resin, a polyolefin resin, a polyphenylene sulfide resin, a polysulfone resin, a polyether sulfone resin, a polyarylate resin, a polyether ether ketone resin, a polyamide imide resin, a liquid crystal polymer, a styrene rubber, an olefin rubber, or the like can be used as the adhesive described above.

Note that, here, a configuration example has been exemplified in which the igniter 40 can be fixed to the lower shell 10 by injection-molding the holder 30 including the resin molding portion. However, other alternative means can be used for fixing the igniter 40 to the lower shell 10.

The cup-shaped member 50 is assembled to the bottom plate portion 11 so as to cover the protruding cylindrical portion 13, the holder 30, and the igniter 40. The cup-shaped member 50 has a bottomed substantially cylindrical shape in which an end close to the bottom plate portion 11 is opened, and internally includes a space that accommodates the enhance agent 59. The cup-shaped member 50 is disposed so as to protrude toward inside of the combustion chamber 60 accommodating the gas generating agent 61 such that the space provided inside the cup-shaped member faces the ignition portion 41 of the igniter 40.

The cup-shaped member 50 includes a top wall portion 51, a cylindrical side wall portion 52 extending from a peripheral edge of the top wall portion 51 toward the bottom plate portion 11, and a flange 62 extending radially outward from an opening end which is an end of the side wall portion 52 close to the bottom plate portion 11.

The side wall portion 52 includes a thin portion 52a provided close to the top wall portion 51, and a thick portion 52b extending from the thin portion 52a to a side opposite to the top wall portion 51 along the axial direction. The thin portion 52a is thicker than a weak member 55 and thinner than the thick portion 52b, and has mechanical strength to rupture (breakage), deformation, or melting in accordance with rupture (breakage), deformation, or melting of the weak member 55.

The flange 62 has a shape bent radially outward in parallel with an annular portion of the protruding cylindrical portion 13. Therefore, a part of the cup-shaped member 50 is not sandwiched between the lower support member 70 and the bottom plate portion 11 of the lower shell 10.

The cup-shaped member 50 does not have an opening in either the side wall portion 52 or the top wall portion 51, and surrounds the space provided inside the cup-shaped member 50. The cup-shaped member 50 ruptures, deforms, or melts with an increase in pressure in the space inside the cup-shaped member 50 or conduction of generated heat when the enhance agent 59 inside an enhancer chamber is ignited by the activation of the igniter 40.

As a material of the cup-shaped member 50, a member including metal such as stainless steel, steel, aluminum, an aluminum alloy, stainless steel, or a stainless alloy, or a member including resin such as thermosetting resin typified by epoxy resin or the like, polybutylene terephthalate resin, polyethylene terephthalate resin, polyimide resin (for example, nylon 6, nylon 66, or the like), polypropylene sulfide resin, or thermoplastic resin typified by polypropylene oxide resin is suitably used. In particular, an aluminum alloy or an iron-based metal material such as stainless steel or steel having a mechanical strength relatively higher than a mechanical such of aluminum is preferable.

A method of fixing the cup-shaped member 50 is not limited to a fixing method using the lower support member 70 described above, and other fixing methods may be used.

At least a part of the top wall portion 51 of the cup-shaped member 50 is provided with the weak member 55 thinner than the side wall portion 52. The weak member 55 is provided by a radially extending slit, and is configured to have a mechanical strength lower than a mechanical strength of the side wall portion 52 of the cup-shaped member 50. Here, the weak member 55 is disposed so as to face the ignition portion 41 of the igniter 40. In addition, a part of the top wall portion 51 other than the weak member 55 extending radially is provided with a non-weak member 56 that is thicker than the weak member 55 and has an equal thickness to the thick portion 52*b*.

As a result, in the space inside the cup-shaped member 50, after the weak member 55 is ruptured (broken), deformed or melted by a thrust generated by the combustion of the enhance agent 59, the thin portion 52*a* is ruptured (broken), deformed or melted in accordance with the rupture (breakage), deformation or melting of the weak member 55, and the mechanical strength of the weak member 55 and the thin portion 52*a* is relatively low. On the other hand, since the non-weak member 56 and the thick portion 52*b* are formed to be thicker than the weak member 55, the non-weak member 56 and the thick portion 52*b* remain after the combustion of the enhance agent 59 due to the activation of the igniter 40.

The thicknesses of the weak member 55 and the thin portion 52*a* and the thicknesses of the non-weak member 56 and the thick portion 52*b* described above are appropriately adjusted on the basis of a type, a filling amount, and the like of the enhance agent 59 to be used. The following is an example of the thicknesses. For example, when the cup-shaped member includes iron, stainless steel, or aluminum alloy, the thicknesses of the weak member 55 and the thin portion 52*a* are 0.6 mm or less, preferably 0.3 mm or less. On the other hand, when the cup-shaped member 50 includes iron, stainless steel, or aluminum alloy, the thicknesses of the non-weak member 56 and the thick portion 52*b* are 0.3 mm or more and 0.9 mm or less, and preferably 0.4 mm or more and 0.6 mm or less on the condition that the thicknesses are larger than the thicknesses of the weak member 55 and the thin portion 52*a*.

The enhance agent 59 filled in the enhancer chamber is ignited by flame generated by the activation of the igniter 40, and generates heat particles by combustion. As the enhance agent 59, it is necessary to be able to reliably start combustion of the gas generating agent 61, and in general, a composition including metal powder/oxidizer typified by B/KNO3, B/NaNO3, Sr(NO3)2, or the like, a composition including titanium hydride/potassium perchlorate, a composition including B/5-aminotetrazole/potassium nitrate/molybdenum trioxide, or the like is used.

The enhance agent 59 is used in a form of powder or a form molded into a predetermined shape by a binder. Examples of the shape of the enhance agent 59 formed by the binder include various shapes such as a granular shape, a columnar shape, a sheet shape, a spherical shape, a single-hole cylindrical shape, a porous cylindrical shape, and a tablet shape.

In a space surrounding the part where the cup-shaped member 50 is disposed in the space inside the housing, the combustion chamber 60 accommodating the gas generating agent 61 is located. Specifically, as described above, the cup-shaped member 50 is disposed so as to protrude into the combustion chamber 60 formed inside the housing. A space provided in the part facing an outer surface of the top wall portion 51 of the cup-shaped member 50 and a space provided in the part facing an outer surface of the side wall portion 52 are configured as the combustion chamber 60. As a result, the gas generating agent 61 is disposed adjacent to an outer surface of the cup-shaped member 50.

In a space surrounding the combustion chamber 60 accommodating the gas generating agent 61 in a radial direction of the housing, the filter 90 is disposed along an inner periphery of the housing. The filter 90 has a cylindrical shape and is disposed to have a central axis of the filter 90 substantially coincides with the axial direction of the housing.

The gas generating agent 61 is an agent that is ignited by heat particles generated by the activation of the igniter 40 and generates a gas by combustion. As the gas generating agent 61, a non-azide gas generating agent is preferably used, and the gas generating agent 61 is generally formed as a molded body containing a fuel, an oxidizer, and an additive.

As the fuel, for example, a triazole derivative, a tetrazole derivative, a guanidine derivative, an azodicarbonamide derivative, a hydrazine derivative, or the like, or a combination thereof is used. Specifically, for example, nitroguanidine, guanidine nitrate, cyanoguanidine, 5-aminotetrazole, or the like is suitably used.

Examples of the oxidizer include basic metal hydroxides such as basic copper nitrate and basic copper carbonate, perchlorates such as ammonium perchlorate and potassium perchlorate, and nitrates containing cations selected from alkali metals, alkaline earth metals, transition metals, and ammonia. As the nitrate, for example, sodium nitrate, potassium nitrate or the like is suitably used.

Examples of the additive include a binder, a slag forming agent, and a combustion adjusting agent. As the binder, for example, an organic binder such as polyvinyl alcohol, a metal salt of carboxymethyl cellulose, or a stearate, or an inorganic binder such as synthetic hydrotalcite or acidic clay can be suitably used. In addition, as the binder, polysaccharide derivatives such as hydroxyethyl cellulose, hydroxypropyl methyl cellulose, cellulose acetate, cellulose propionate, cellulose acetate butyrate, nitrocellulose, microcrystalline cellulose, guar gum, polyvinyl pyrrolidone, polyacrylamide, and starch, and inorganic binders such as molybdenum disulfide, talc, bentonite, diatomaceous earth, kaolin, and alumina can also be suitably used. As the slag forming agent, silicon nitride, silica, acid clay, and the like can be suitably used. As the combustion adjusting agent, metal oxide, ferrosilicon, activated carbon, graphite, and the like can be suitably used.

The shape of the molded body of the gas generating agent 61 includes various shapes such as a granular shape, a pellet shape, a cylindrical granular shape, and a disk shape. In addition, as the cylindrical molded body, a porous (for example, a single-hole cylindrical shape, a porous cylindrical shape, or the like) molded body having a through hole in the molded body is also used. These shapes are preferably appropriately selected in accordance with the specifications of an airbag device in which the disk-type gas generator 100 is incorporated, and it is preferable to select an optimum shape according to the specifications, for example, a shape in which a gas generation speed changes with time at the time of combustion of the gas generating agent 61 is selected. In addition to the shape of the gas generating agent 61, it is preferable to appropriately select a size and a filling amount of the molded body in consideration of a linear combustion speed, a pressure index, and the like of the gas generating agent 61.

As the filter 90, for example, a binder obtained by winding and sintering a metal wire material such as stainless steel or steel, a binder obtained by pressing a net material by press working with which a metal wire material is interwoven, and the like can be used. As the net material, specifically, a knitted wire mesh, a plain weave wire mesh, an aggregate of crimp weave metal wire materials, and the like can be used.

As the filter 90, a filter obtained by winding a perforated metal plate or the like can also be used. In this case, as the perforated metal plate, for example, an expanded metal obtained by cutting a metal plate in a zigzag manner, expanding the metal plate to form holes, and processing the metal plate into a mesh shape, a hook metal obtained by flattening a metal plate by drilling holes in the metal plate and crushing burrs generated at peripheral edges of the holes at that time, or the like is used. In this case, the size and shape of the holes to be formed can be appropriately changed as necessary, and holes having different sizes and shapes may be included on the same metal plate. As the metal plate, for example, a steel plate (mild steel) or a stainless steel plate can be suitably used, and a non-ferrous metal plate such as aluminum, copper, titanium, nickel, or an alloy thereof can also be used.

The filter 90 functions as a cooling means that cools gas by depriving high temperature heat of the gas when the gas generated in the combustion chamber 60 passes through the filter 90, and also functions as a removal means that removes residues (slag) and the like contained in the gas. Therefore, in order to sufficiently cool the gas and prevent the residue from being released to the outside, it is necessary to ensure that the gas generated in the combustion chamber 60 passes through the filter 90. The filter 90 is disposed apart from the circumferential wall portions 12 and 22 so that a gap 28 having a predetermined size is formed between the circumferential wall portion 12 of the lower shell 10 and the circumferential wall portion 22 of the upper shell 20 constituting the circumferential wall portion of the housing.

A part of the circumferential wall portion 22 of the upper shell 20 facing the filter 90 is provided with a plurality of gas ejection ports 23. The plurality of gas ejection ports 23 is for leading out the gas that has passed through the filter 90 to the outside of the housing.

A metallic seal tape 24 as a seal member is attached to an inner peripheral surface of the circumferential wall portion 22 of the upper shell 20 so as to close the plurality of gas ejection ports 23. As the seal tape 24, an aluminum foil or the like having one surface coated with an adhesive member can be suitably used, and airtightness of the combustion chamber 60 is secured by the seal tape 24.

The lower support member 70 is disposed near an end of the combustion chamber 60, located close to the bottom plate portion 11. The lower support member 70 has an annular shape, and is disposed to be substantially fitted to the filter 90 and the bottom plate portion 11 so as to cover a boundary between the filter 90 and the bottom plate portion 11. As a result, the lower support member 70 is positioned between the bottom plate portion 11 and the gas generating agent 61 near the above-described end of the combustion chamber 60.

The lower support member 70 includes an annular plate-shaped base portion 71 fitted to the bottom plate portion 11 along an inner bottom surface of the bottom plate portion 11, an abutment portion 72 abutting on an inner peripheral surface of the filter 90 near the bottom plate portion 11, and a cylindrical erected portion 73 erected from the base portion 71 toward the top plate portion 21. The abutment portion 72 extends from an outer edge of the base portion 71, and the erected portion 73 extends from an inner edge of the base portion 71. The erected portion 73 covers an outer peripheral surface of the protruding cylindrical portion 13 of the lower shell 10 and an outer peripheral surface of the inner cover 31 of the holder 30.

The lower support member 70 is a member for fixing the filter 90 to the housing, and also functions as an outflow preventing means for preventing the gas generated in the combustion chamber 60 from flowing out from the gap between a lower end of the filter 90 and the bottom plate portion 11 without passing through the inside of the filter 90 at the time of activation. Therefore, the lower support member 70 is formed by, for example, pressing a plate-like member including metal, and is preferably formed with a member including a steel plate (for example, a cold-rolled steel plate, a stainless steel plate, or the like) such as ordinary steel or special steel.

The upper support member 80 is disposed near an end of the combustion chamber 60, located close to the top plate portion 21. The upper support member 80 has a substantially disk shape, and is disposed to be fitted to the filter 90 and the top plate portion 21 so as to cover a boundary between the filter 90 and the top plate portion 21. As a result, the upper support member 80 is positioned between the top plate portion 21 and the gas generating agent 61 near the above-described end of the combustion chamber 60.

The upper support member 80 includes a base portion 81 abutting on the top plate portion 21 and an abutment portion 82 erected from a peripheral edge of the base portion 81. The abutment portion 82 abuts on an inner peripheral surface of an axial end of the filter 90 located close to the top plate portion 21.

The upper support member 80 is a member for fixing the filter 90 to the housing, and also functions as an outflow preventing means for preventing the gas generated in the combustion chamber 60 from flowing out from the gap between an upper end of the filter 90 and the top plate portion 21 without passing through the inside of the filter 90 at the time of activation. Therefore, the upper support member 80 is formed by, for example, pressing a plate-like member including metal, and is preferably formed with a member including a steel plate (for example, a cold-rolled steel plate, a stainless steel plate, or the like) such as ordinary steel or special steel.

A disk-shaped cushion material 85 is disposed inside the upper support member 80 so as to be in contact with the gas generating agent 61 accommodated in the combustion chamber 60. As a result, the cushion material 85 is located between the top plate portion 21 and the gas generating agent 61 in a part of the combustion chamber 60 close to the top plate portion 21, and presses the gas generating agent 61 toward the bottom plate portion 11.

The cushion material 85 is provided for the purpose of preventing the gas generating agent 61 formed with a molded body from being pulverized by vibration or the like, and preferably includes a molded body of a ceramic fiber, rock wool, a member containing foamed resin (for example, foamed silicone, foamed polypropylene, foamed polyethylene, foamed urethane, and the like), or rubber or the like typified by chloroprene and EPDM.

Next, a procedure of assembling work of the disk-type gas generator 100 according to the present embodiment will be described with reference to FIG. 1.

First, in the lower shell 10, the igniter 40 is fixed by being injection-molded as the holder 30 including the resin molding portion. Then, the side wall portion 52 of the cup-shaped member 50 in which the enhance agent 59 is stored is fixed by press-fitting into the holder 30 of the lower shell 10.

Then, the inside of the filter 90 is filled with the gas generating agent 61, and the upper support member 80 with the cushion material 85 interposed is inserted into the upper end of the filter 90. Thereafter, the upper shell 20 in which the gas ejection port 23 is closed by the seal tape 24 is covered with the lower shell 10, and the lower shell 10 and the upper shell 20 are welded. Thus, the assembly of the gas generator 100 having the structure shown in FIG. 1 is completed.

Here, in the disk-type gas generator 100 according to the present embodiment, since the cup-shaped member 50 is not provided with an opening, a step of filling the enhance agent 59 into the enhancer chamber 57 provided inside the cup-shaped member 50 can be performed significantly easily. This is because the cup-shaped member 50 itself includes a fragile member having low mechanical strength so that a part of the cup-shaped member ruptures, deforms, or melts when the disk-type gas generator 100 is in activation. This configuration eliminates the need for the work of closing the opening provided in the cup-shaped member to fill the enhance agent 59 and, for example, an aluminum tape or a closing plate, which are necessary in the case of using the cup-shaped member having the opening, and thus can significantly simplify a manufacturing process.

Figure 3:
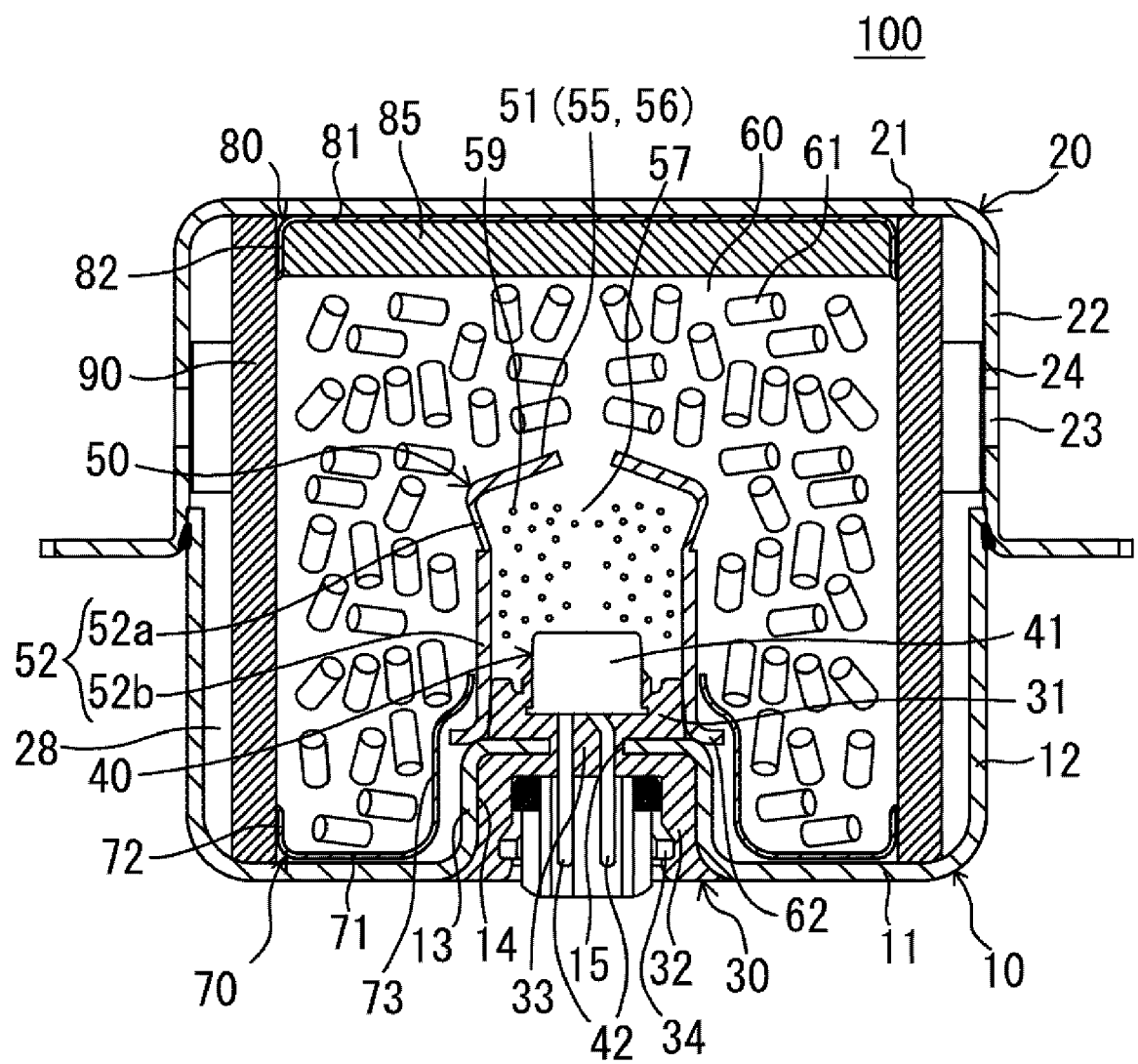
FIG. 3 is a schematic sectional view for describing an activation of the disk-type gas generator of FIG. 1.

FIG. 3 is a schematic sectional view for describing an activation of the disk-type gas generator. Next, an activation of the disk-type gas generator 100 according to the present embodiment will be described with reference to FIGS. 1 and 3.

Referring to FIG. 1, when a vehicle equipped with the disk-type gas generator 100 collides, the collision is detected by a collision detector separately provided in the vehicle, and on the basis of the detection, the igniter 40 is activated by energization from a control unit separately provided in the vehicle. The enhance agent 59 accommodated in the enhancer chamber 57 is ignited by flame generated by the activation of the igniter 40, and starts combustion.

At this time, as shown in FIG. 3, immediately after the igniter 40 is activated, the ignition charge filled in the ignition portion 41 rapidly combusts to rupture the squib cup of the ignition portion 41, and a thrust generated by the rapid combustion of the ignition charge is transmitted to the enhance agent 59 filled in the enhancer chamber 57.

Figure 2:
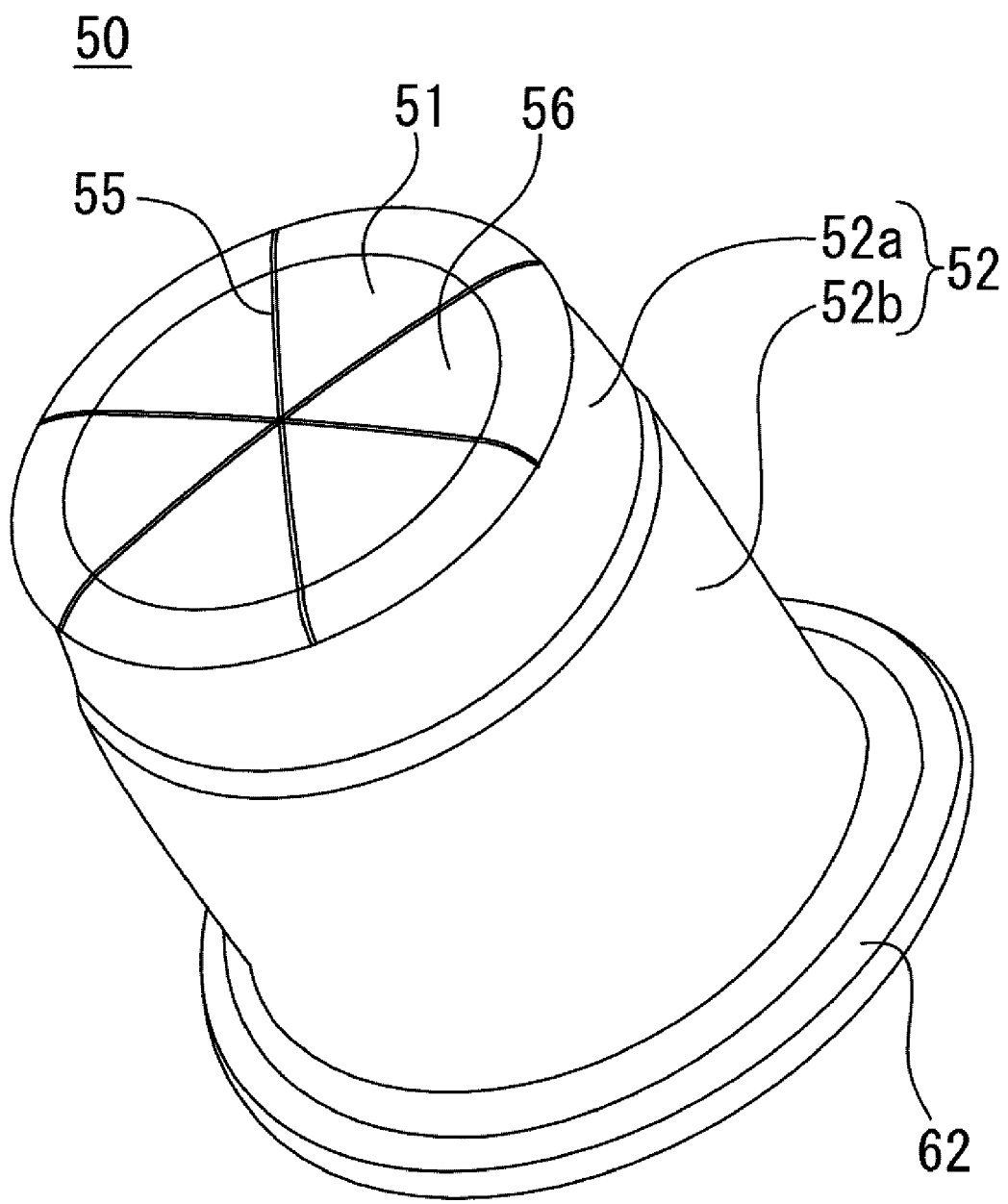
FIG. 2 is a perspective view of a cup-shaped member of the disk-type gas generator of FIG. 1.

As shown in FIG. 3, when the thrust reaches the top wall portion 51 of the cup-shaped member 50, the weak member 55 of the cup-shaped member 50 including a fragile member ruptures, deforms, or melts. The rupture, deformation, or melting of the weak member 55 of the cup-shaped member 50 occurs later than the ignition of the enhance agent 59 by heat particles generated by the combustion of the ignition charge. Since the weak member 55 does not exist in the side wall portion 52 and the weak member 55 exists in the top wall portion 51, the weak member 55 of the top wall portion 51 ruptures, deforms, or melts, and an internal pressure increases until the top wall portion 51 ruptures, deforms, or melts. Here, the enhance agent 59 of the cup-shaped member 50 is scattered and dispersed inside the cup-shaped member 50 by receiving the thrust generated by the combustion of the ignition charge. As shown in FIG. 2, the weak member 55 is provided as a slit, the top wall portion 51 of the cup-shaped member 50 first ruptures, deforms, or melts, and cleaves toward the thin portion 52a of the side wall portion 52. The thin portion 52a ruptures (breaks), deforms, or melts in accordance with the rupture (breakage), deformation, or melting of the weak member 55, and cleaves to a connection portion with the thick portion 52b. Here, the thick portion 52b does not rupture (break), deform, or melt.

Therefore, the enhance agent 59 at a position far from the igniter 40 is also ignited by the heat particles in a shorter time and starts combustion. As a result, a pressure increase in the space inside the cup-shaped member 50 and a temperature increase in the space are greatly promoted.

As a result, the weak member 55 and the thin portion 52a of the cup-shaped member 50 sequentially ruptures, deforms, or melts in a shorter time, and a large amount of heat particles generated by the combustion of the enhance agent 59 flows into the combustion chamber 60 at an early stage.

In particular, in FIG. 1, the cup-shaped member 50, which includes iron or stainless steel and has higher strength than aluminum, does not rupture, deform, or melt at an initial stage of combustion of the enhance agent 59. At this time, the internal pressure of the cup-shaped member 50 increases until a predetermined time elapses during which the weak member 55 of the cup-shaped member ruptures, deforms, or melts. Then, after the internal pressure reaches a certain level or more, the weak member 55 and the thin portion 52a of the cup-shaped member 50 rupture, deform, or melt sequentially. Therefore, by increasing the mechanical strength of the cup-shaped member 50 by using an iron-base portioned metal material having high mechanical strength, such as iron or stainless steel, the combustion of the enhance agent 59 can be sufficiently promoted when the cup-shaped member 50 is cleaved, and the cup-shaped member 50 can be cleaved in a state where the combustion of the gas generating agent 61 is promoted. The mechanical strength of the cup-shaped member 50 can be also improved by increasing the thickness even when a metal having low strength such as aluminum is used. The thickness in that case is preferably 0.4 mm or more and 1.5 mm or less, and more preferably 0.6 mm or more and 1.2 mm or less.

In this way, when a large amount of heat particles flows into the combustion chamber 60, the gas generating agent 61 accommodated in the combustion chamber 60 is ignited and combusts, and a large amount of gas is generated. The gas generated in the combustion chamber 60 passes through the inside of the filter 90, and at that time, heat is deprived by the filter 90 and cooled, and the slag contained in the gas is removed by the filter 90 and flows into the gap 28.

Hereinafter, with reference to FIG. 1, a mechanism will be described in which transmission of flame energy by the enhance agent 59 can be suitably controlled in the case of the disk-type gas generator 100 according to the embodiment of the present invention.

As shown in FIG. 2, in the disk-type gas generator 100 according to the embodiment of the present invention, in the top wall portion 51 of the cup-shaped member 50, the weak member 55 is configured by radially reducing the thickness of the top wall portion 51 as compared with other parts, and the non-weak member 56 is configured by increasing the thickness of the remaining part of the top wall portion 51 of the cup-shaped member 50 as compared with the thickness of the weak member 55. The thin portion 52a of the side wall portion 52 of the cup-shaped member 50 is configured to be thicker than the weak member 55 and thinner than the thick portion 52b, and the thick portion 52b of the side wall portion 52 of the cup-shaped member 50 is configured to be thicker than the weak member 55 and the thin portion 52a and to have an equal thickness to the non-weak member 56.

This configuration allows the weak member 55 to rupture, deform, or melt first. Here, since the cup-shaped member 50 ruptures, deforms, or melts from a starting point, there is no possibility that the side wall portion 52 where the weak member 55 does not exist first ruptures, deforms, or melts, and the top wall portion 51 ruptures, deforms, or melts after the enhance agent 59 sufficiently combusts. Thereafter, the top wall portion 51 is cleaved along the weak member 55 with the ruptured, deformed, or melted weak member 55 as a starting point. After the cleavage of the top wall portion 51, the cleavage reaches the thin portion 52a of the side wall portion 52 and continues to cleave the thin portion 52a of the side wall portion 52. Then, the cleavage stops at the connection portion between the thin portion 52a and the thick portion 52b. In this way, since the cleavage occurs along a longitudinal direction of the weak member 55, the connection portion between the thin portion 52a and the thick portion 52b is cleaved in a petal shape. Therefore, when the cup-shaped member 50 cleaves halfway (to the connection portion between the thin portion 52a and the thick portion 52b) and stops, the cup-shaped member expands in a direction toward the top plate portion 21 with a lapse of time, and is opened in a state where the size of breakage of the cup-shaped member 50 is stable. Thus, the heat particles generated by combustion of the enhance agent 59 flow into the top plate portion 21 with more directivity.

Specifically, in a first stage of the cleavage in which the weak member 55 ruptures, deforms, or melts and the non-weak member of the top wall portion 51 is cleaved with the weak member 55 as a starting point, the top wall portion 51 of the cup-shaped member 50 ruptures, deforms, or melts, and the side wall portion 52 remains. Therefore, the heat particles generated by the combustion of the enhance agent 59 flow toward the top plate portion 21, and the flame flowing into the combustion chamber 60 is narrowed between the cup-shaped member 50 and the top plate portion 21. As a result, all of the gas generating agent 61 adjacent to the cup-shaped member 50 is not ignited at the same time, and a spread of combustion of the gas generating agent 61 progresses around a space between the enhancer chamber 57 and the top plate portion 21.

After the rupture, deformation, or melting of the top wall portion 51 of the cup-shaped member 50 progresses, next, the cleavage of the thin portion 52a proceeds as a second stage. Here, the cleavage of the side wall portion 52 progresses along the longitudinal direction in which the weak member 55 radially provided on the top wall portion 51 is provided, and in the thin portion 52a, the cleavage progresses downward in the axial direction of the side wall portion 52, but stops after progressing midway through (to the connection portion between the thin portion 52a and the thick portion 52b). Therefore, the heat particles generated by the combustion of the enhance agent 59 also flow into the combustion chamber 60 from the cleaving part. As a result, the spread of combustion also proceeds to the gas generating agent 61 between the thin portion 52a and the filter 90, and subsequently, the spread of combustion also proceeds to the gas generating agent 61 between the thick portion 52b and the filter 90.

Therefore, by providing the weak member 55, the non-weak member 56, the thin portion 52a, and the thick portion 52b in the cup-shaped member 50 and appropriately adjusting the position, size, and the like of the weak member 55, the non-weak member 56, the thin portion 52a, and the thick portion 52b, it is possible to prevent the gas generating agent 61 from combusting rapidly, intentionally delay the progress of the combustion, and significantly easily optimize an adjustment of gas output by, for example, maintaining the gas output for a predetermined time in accordance with the specification.

In a case where the entire side wall portion 52 of the cup-shaped member 50 is configured to be thin, there is a possibility that an impact when the cup-shaped member 50 is ruptured, deformed, or melted by combustion of the enhance agent 59 is applied to the filter 90, and the filter 90 is damaged. However, by configuring a part (thick portion 52b) of the side wall portion 52 of the cup-shaped member 50 to be thick and providing the weak member 55 in the top wall portion 51 as in the disk-type gas generator 100 according to the embodiment of the present invention, heat particles are directed toward the top plate portion 21 at an initial stage of rupture, deformation, or melting of the cup-shaped member 50. Therefore, it is possible to obtain an effect that the impact applied to the filter 90 is alleviated and the damage is prevented in advance.

Furthermore, by adopting the above configuration, the top wall portion 51 instantaneously ruptures, deforms, or melts at the time of ignition, the combustion of the gas generating agent 61 between the top wall portion 51 and the top plate portion 21 proceeds immediately. Therefore, a delay of the gas output does not occur, the internal pressure in the gas generator rapidly increases, and further, the occurrence of variations in output characteristics can be prevented in advance.

As the pressure in the space inside the housing increases due to the combustion of the gas generating agent 61, the seal tape 24 closing the gas ejection port 23 provided in the upper shell 20 is cleaved, and the gas is ejected to the outside of the housing through the gas ejection port 23. The ejected gas is introduced into an airbag provided adjacent to the disk-type gas generator 100, and inflates and deploys the airbag.

Here, whether the weak member 55 and the thin portion 52a of the cup-shaped member 50 rupture, deform, or melt sequentially by transmission of the thrust generated by the activation of the igniter 40 is determined by the mechanical strength (thickness, material, shape, and the like) of the cup-shaped member, output of the igniter 40, a distance between the ignition portion 41, the cup-shaped member, and the weak member 55, a density of the enhance agent 59 filled in the enhancer chamber, and the like.

As described above, in order to rupture, deform, or melt the weak member 55 and the thin portion 52a of the cup-shaped member 50 sequentially by utilizing the pressure increase and the temperature increase in the enhancer chamber due to the combustion of the enhance agent 59, the mechanical strength (thickness, material, shape, and the like) of the cup-shaped member 50, the output of the igniter 40, the distance between the ignition portion 41 and the weak member 55 of the cup-shaped member 50, the density of the enhance agent 59 filled in the enhancer chamber, and the like described above are only required to be adjusted in various ways. However, the sequential rupture, deformation, or melting can be relatively easily achieved by configuring particularly the member of the cup-shaped member 50 with a member of an iron-based metal material such as iron and stainless steel as described above.

In any case, the weak member 55 of the cup-shaped member 50 preferably has a mechanical strength lower than the mechanical strength of the side wall portion 52 of the cup-shaped member 50. As a method of making the weak member 55 of the cup-shaped member 50 more fragile than the side wall portion 52 of the cup-shaped member 50, it is assumed that the thicknesses of the portions are adjusted, materials of the portions are made different, or the shapes the portions are devised.

Such a configuration can make it relatively easy to rupture, deform, or melt the weak member 55 before the thin portion 52a of the cup-shaped member 50 ruptures, deforms, or melts. However, when the weak member 55 can be ruptured, deformed, or melted before the thin portion 52a of the cup-shaped member 50 ruptures, deforms, or melts, the weak member 55 and the thin portion 52a of the side wall portion 52 of the cup-shaped member 50 may have a substantially equal mechanical strength.

As described above, in the embodiment of the present invention described above, it is possible to provide the disk-type gas generator 100 that can control the size of rupture (breakage) in the cup-shaped member 50 to be stabilized while increasing the mechanical strength of the cup-shaped member 50. Since the size of rupture of the cup-shaped member 50 is stabilized (a breakage region becomes uniform), the disk-type gas generator 100 can exhibit predetermined performance while the amount of the enhance agent 59 can be reduced.

Since the combustion of the enhance agent 59 is promoted, it is possible to start the combustion of the gas generating agent 61 at an early stage, and as a result, time from a time point when the igniter is activated to a time point when the gas starts to be ejected to the outside through the gas ejection port 23 can be shortened as compared with the conventional art. In addition, by adding the weak member 55 and the thin portion 52a of the cup-shaped member 50, the breakage region can be uniform, and component processing is increased, but the filling amount of the enhance agent 59 can be greatly reduced, and the time from the time point when the igniter is activated to the time point when the gas starts to be ejected to the outside through the gas ejection port 23 can be shortened at low cost.

Since the filling amount of the enhance agent 59 is reduced, the volume of the cup-shaped member 50 can be made smaller than that in the conventional art. Therefore, the weight can be reduced by optimizing the volume of the disk-type gas generator 100.

In addition, since gas temperature decreases as the filling amount of the enhance agent 59 decreases, cooling capacity of the filter 90 may be reduced accordingly. As a result, the weight of the filter 90 can be reduced.

(Verification Test)

Next, a disk-type gas generator having the same configuration as the configuration of the disk-type gas generator 100 was produced, and a verification test was conducted to see what kind of change occurred in a 60 L tank test by changing the shape, dimension, and the like of a cup-shaped member. Here, the 60 L tank test is a test in which a temperature of a disk-type gas generator (specifically, see Examples 1 to 3 below) having a cup-shaped member is adjusted in an environment of −40° C.±2° C. for four hours or more, and then the disk-type gas generator is individually installed in a 60 L volume sealed tank, and an increase in internal pressure of the tank is measured over time by activating the disk-type gas generator. In the verification test, a gas pressure from a time point when an igniter was activated to 100 ms was measured over time. The number of moles of the gas generated by a gas generating agent in each disk-type gas generator is 2 mol, and a filling amount of an enhance agent into the cup-shaped member is 1.2 g. The material of each cup-shaped member in the verification test is an aluminum alloy.

Example 1

The verification test was performed twice for each of a disk-type gas generator (hereinafter, a conventional gas generator) provided with a conventional cup-shaped member (specification name: stepless) having a constant thickness (thickness of 1 mm) and a disk-type gas generator (hereinafter, a gas generator of the present invention) having the same configuration as the disk-type gas generator 100 provided with a cup-shaped member (specification name: stepped) having a thin portion of 0.5 mm in thickness, a thin portion of 5 mm in axial length, a thick portion of 1 mm in thickness, and a thick portion of 15 mm in axial length. A weak member in each cup-shaped member is similar to the weak member 55 according to the above embodiment, and has a slit depth of 0.6 mm (remaining thickness of 0.4 mm) and a width of 3 mm. The axial length of each cup-shaped member in each gas generator is the same. Other conditions are the same between the conventional gas generator and the gas generator of the present invention.

Figure 4:
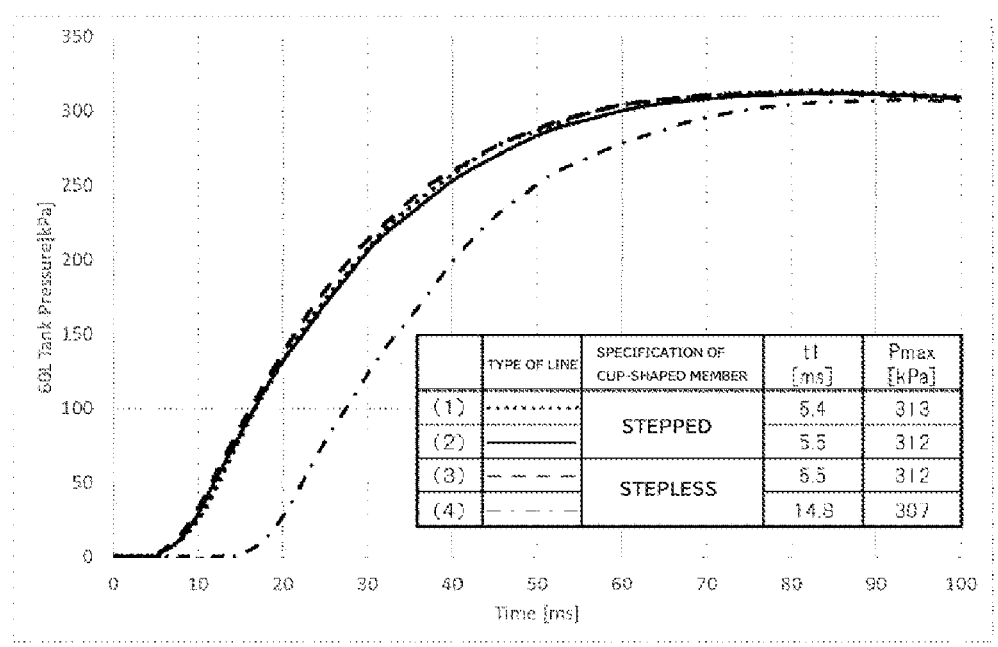
FIG. 4 is a diagram showing test conditions and test results of a verification test.

FIG. 4 shows results of the verification tests of the conventional gas generator and the gas generator of the present invention. Note that t1 is time until gas output is detected, and Pmax is a maximum value of a pressure in the tank.

In the gas generator of the present invention, as shown in (1) and (2) of FIG. 4, it has been found that not only a high gas output is obtained at a relatively early stage from the time when the igniter is activated, but also a similar pressure change is caused in both of the two verification tests. That is, it has been found that the cup-shaped member can stably exhibit preferable gas output performance in the gas generator of the present invention.

On the other hand, in the conventional gas generator, in the verification test in the case shown in (3) of FIG. 4, gas output performance similar to the gas output performance of the gas generator of the present invention was exhibited, but in the verification test in the case shown in (4) of FIG. 4, the time until the gas output was detected was delayed as compared with the verification tests in (1) to (3) of FIG. 4, and the process of the gas output as in (1) to (3) of FIG. 4 was not be obtained. That is, it has been found that, in the configuration of the conventional gas generator, the gas output process may vary for each gas generator.

Therefore, it has been found that the gas generator of the present invention can stably exhibit preferable gas output performance as compared with the conventional gas generator.

Example 2

Figure 5A:
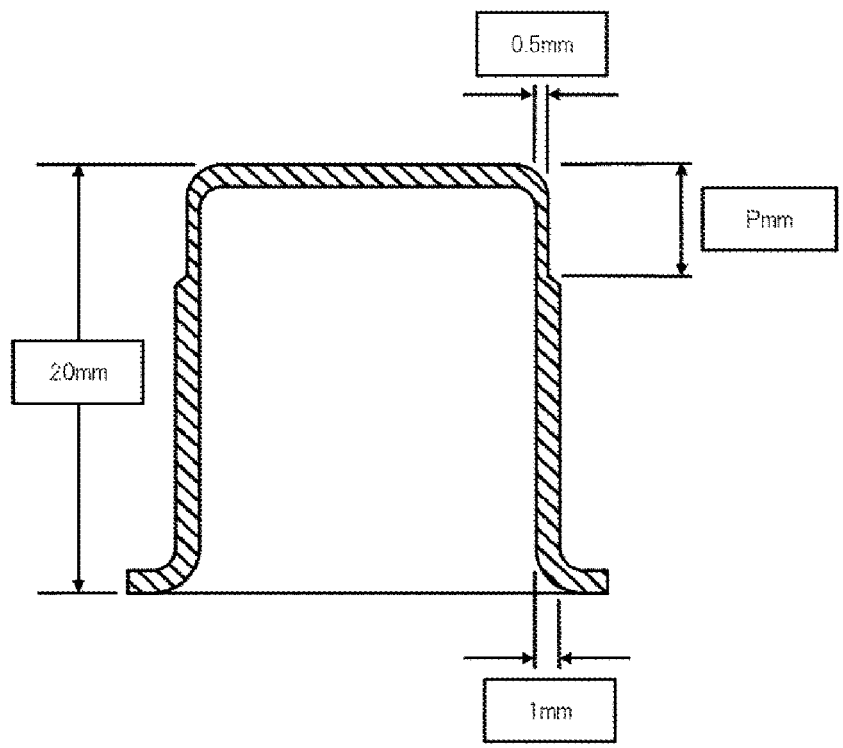
FIG. 5(*a*) is a schematic sectional view of a shape of a cup-shaped member used in a verification test, and FIG. 5(*b*) is a view showing test conditions and test results of the verification test.
Figure 5B:
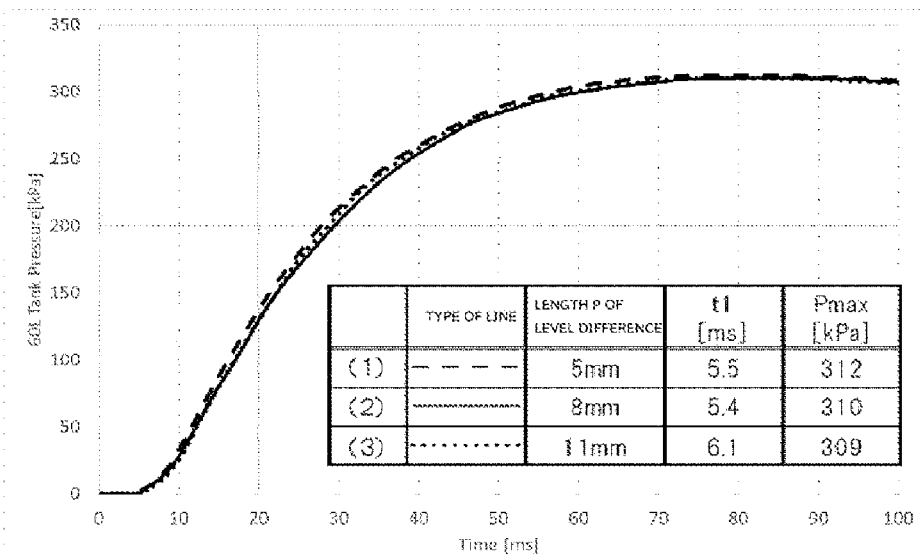

In the gas generator of the present invention similar to Example 1, a verification test was conducted to see what kind of gas output would be obtained when an axial length Pmm of the thin portion was changed to (1) 5 mm, (2) 8 mm, and (3) 11 mm without changing an internal volume of the cup-shaped member (see FIG. 5 (a)) having an axial height of 20 mm, a thickness of 0.5 mm of the thin portion, a slit depth of 0.6 mm (remaining thickness 0.4 mm) and a width of 3 mm of the weak member, and a thickness of 1 mm of the other portion, and the 60 L tank test was conducted in a similar manner to Example 1. Other conditions of the gas generators are the same. FIG. 5(b) shows the results of the verification test.

In the gas generator of this example, as shown in FIG. 5(b), it has been found that even when the axial length Pmm of the thin portion of the cup-shaped member of FIG. 5(a) is changed to (1) 5 mm, (2) 8 mm, and (3) 11 mm, preferable gas output performance can be exhibited almost similarly to Example 1.

Example 3

Figure 6A:
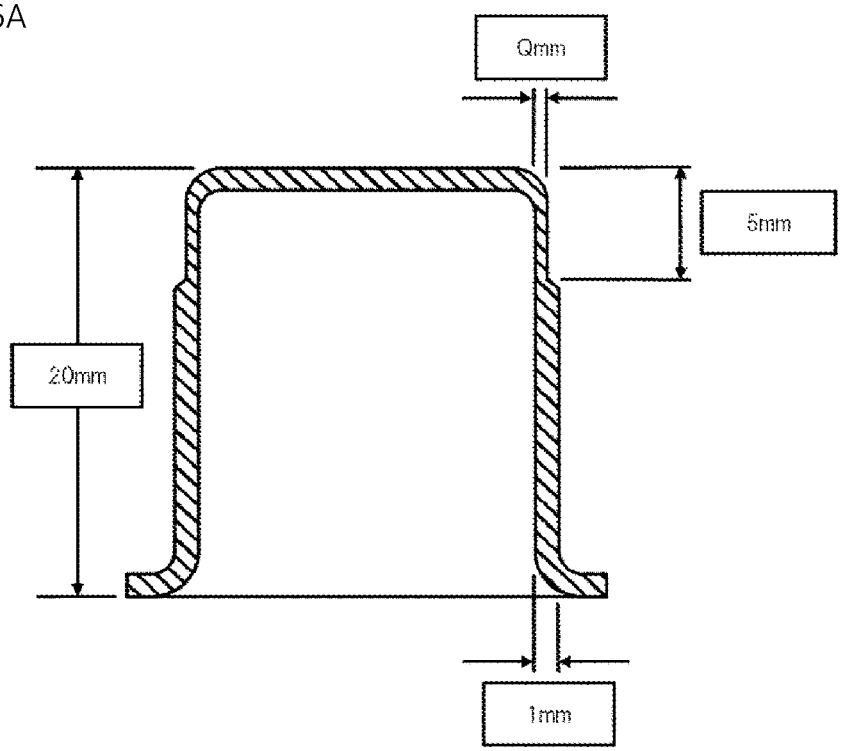
FIG. 6(*a*) is a schematic sectional view of a shape of a cup-shaped member used in a verification test, and FIG. 6(*b*) is a view showing test conditions and test results of the verification test.
Figure 6B:
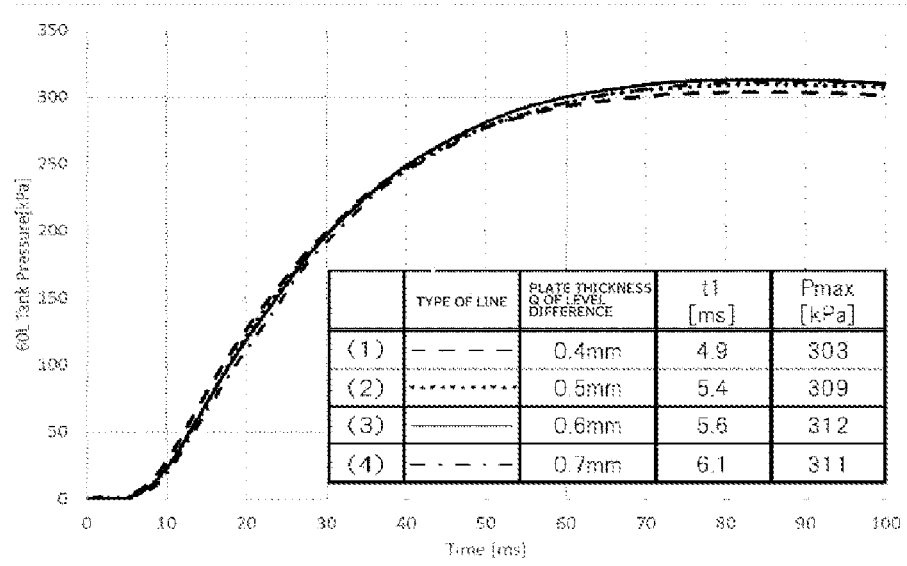

In the gas generator of the present invention similar to Example 1, a verification test was conducted to see what kind of gas output would be obtained when a thickness Qmm of the thin portion was changed to (1) 0.4 mm, (2) 0.5 mm, (3) 0.6 mm, and (4) 0.7 mm without changing an internal volume of the cup-shaped member (see FIG. 6(a)) having an axial height of 20 mm, an axial length of 5 mm of the thin portion, a slit depth of 0.6 mm (remaining thickness 0.4 mm) and a width of 3 mm of the weak member, and a thickness of 1 mm of the other portion, and the 60 L tank test was conducted in a similar manner to Example 1. Other conditions of the gas generators are the same. FIG. 6(b) shows the results of the verification test.

In the gas generator of this example, as shown in FIG. 6(b), it has been found that even when the thickness Qmm of the thin portion of the cup-shaped member of FIG. 6(a) is changed to (1) 0.4 mm, (2) 0.5 mm, (3) 0.6 mm, and (4) 0.7 mm, preferable gas output performance can be exhibited almost similarly to Examples 1 and 2.

MODIFICATIONS AND OTHERS

Hereinafter, modifications of the embodiment of the present invention will be described. The same names are used for portions having similar functions unless otherwise specified. In each modification, portions similar to the portions in the embodiment are denoted by the same reference signs in the last two digits and the description thereof may be omitted unless otherwise specified.

The cup-shaped member 50 according to the embodiment of the present invention is applicable to, for example, a disk-type gas generator provided with two igniters called dual inflators similarly to the disk-type gas generator 100 according to the present embodiment, and is also applicable to other gas generators.

The weak member 55 of the cup-shaped member 50 is not limited to the weak member shown in FIG. 2. For example, as long as the slits constituting the weak member 55 are radially provided, any number of slits may be used. For example, the weak member may be provided with slits in a cross shape or an asterisk shape in plan view.

The uneven shape of the weak member 55 is not limited to the above-described shape, and may be any shape. For example, an annular convex portion may be provided by swelling a part of the non-weak member 56 toward the top wall portion 51, or the entire weak member 55 may be curved so as to form a concave portion. In addition, a plurality of convex portions or concave portions may be provided in the weak member 55 in a point sequence shape or a matrix shape. Furthermore, the top wall portion 51 may be provided with a circular or annular weak member 55.

The slit of the weak member 55 may be continuously extended to a surface (outer wall) of the thin portion 52a of the side wall portion 52.

Figure 7:
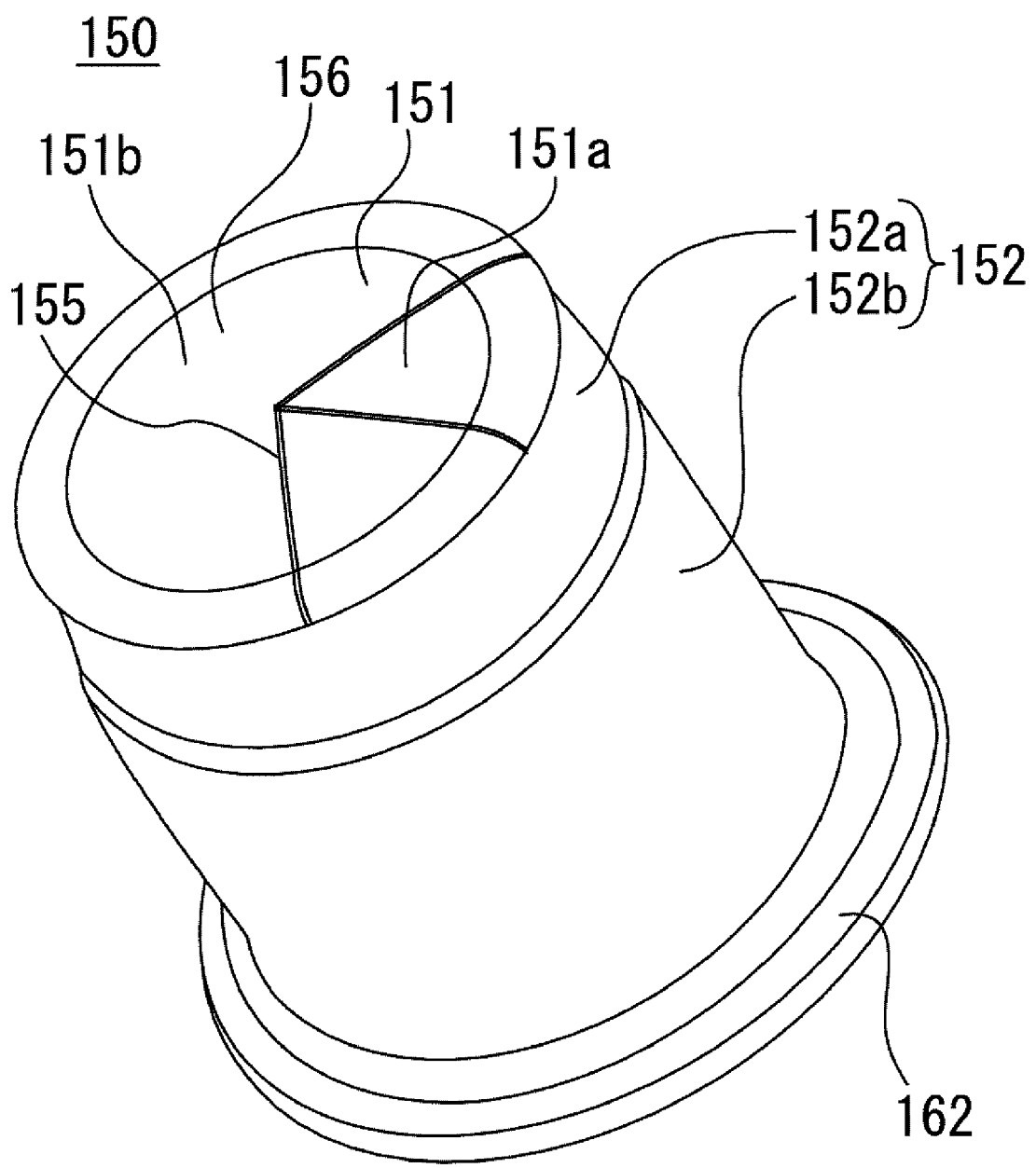
FIG. 7 is a perspective view of a cup-shaped member according to a modification of the embodiment of the present invention.

In addition, a cup-shaped member 150 shown in FIG. 7 may be applied instead of the cup-shaped member 50 in accordance with the purpose. The cup-shaped member 150 is mainly different in that the slits (weak member) are not formed over the entire circumference whereas the slits (weak member) are formed over an entire circumference of the cup-shaped member 50. Hereinafter, a specific description will be given. Note that portions similar to portions in the embodiment are denoted by the same reference signs in the last two digits, and the description thereof may be omitted.

A weak member 155 is disposed biased by being provided between specific angles when viewed from a circumferential direction. Here, a region where the weak member is provided at an angle of half the circumference (180° in angle) or less when viewed from above in an axial direction is referred to as a weak member existing region, and a region where the weak member is not provided at an angle exceeding half the circumference (180° in angle) when viewed from above in the axial direction is referred to as a weak member non-existing region. In FIG. 7, the presence of a weak member existing region 151a and a weak member non-existing region 151b causes rupture, deformation, or melting of the cup-shaped member to occur in the weak member existing region 151a earlier than in the weak member non-existing region 151b. Thus, the heat particles generated by combustion of the enhance agent flow into the combustion chamber with directivity.

With such a configuration, not only the effects described in the above embodiment can be obtained, but also the weak member 155 and a thin portion 152a more reliably rupture, deform, or melt at the time of the activation of the igniter. Thus, the effect of reliably promoting the combustion of the enhance agent can be obtained. Furthermore, since the weak member 155 unevenly existing in half the circumference of the thin portion 152a first ruptures, deforms, or melts, directivity can be given to a direction in which combustion gas of the enhance agent flows into the combustion chamber. The present invention is also applicable to a disk-type gas generator provided with two igniters called dual inflators described above.

Note that, in FIG. 7, the slits of the weak member are radially provided at an angle of 60° toward three positions from the center, but the present invention is not limited thereto. For example, the slits of the weak member may be formed in a substantially V shape at two positions at an angle of 60°, or the slits of the weak member may be formed radially at four or more positions from the center at an angle of 30°.

In the embodiment of the present invention and the modifications of the embodiment described above, the case where the upper shell and the lower shell are formed by a press-molded product formed by pressing a metal member has been exemplified. However, the present invention is not necessarily limited to this case. An upper shell and a lower shell formed by a combination of pressing and other processing (forging, drawing, cutting, and the like) may be used, or an upper shell and a lower shell formed only by the other processing may be used.

In the embodiment of the present invention and the modifications of the embodiment, the case where the protruding cylindrical portion is provided in the lower shell has been exemplified, but the present invention is naturally applicable to a gas generator having a configuration in which the protruding cylindrical portion is not provided.

Furthermore, in the embodiment of the present invention and the modifications of the embodiment, the description has been given by exemplifying the case of using, as the cup-shaped member, a member that ruptures, deforms, or melts with an increase in pressure in the space inside the cup-shaped member or conduction of generated heat when the enhance agent is ignited by the activation of the igniter. However, a cup-shaped member having another configuration may be used. Specifically, it is also possible to use, as the cup-shaped member, a member having high mechanical strength, such as a stainless alloy, in which an opening is provided in advance, and the opening is closed by a seal tape, so that the closing of the seal tape is broken at the time of activation.

Examples of modifications of the embodiment include gas generators and cup-shaped members shown in FIGS. 8 to 11. Hereinafter, a gas generator and a cup-shaped member according to each modification will be described focusing on differences from the above embodiment.

Figure 8A:
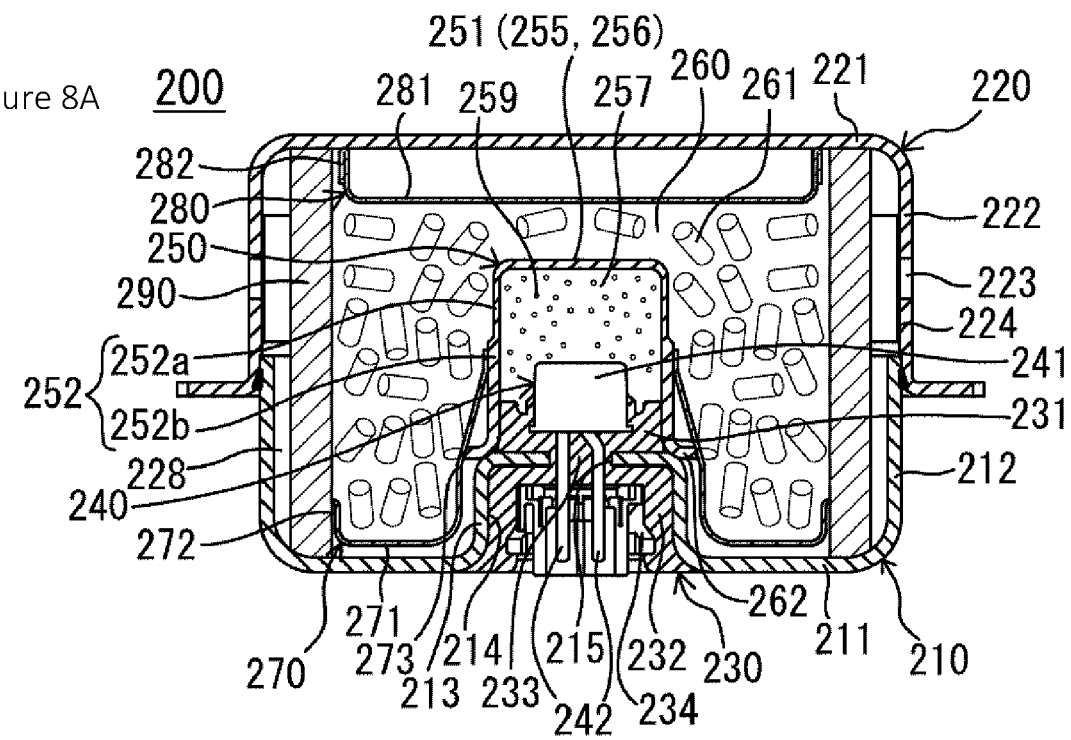
FIG. 8 is a schematic sectional view of a gas generator according to a modification of the embodiment of the present invention.

The gas generator of FIG. 8(a) is different from the above embodiment in that an upper end of an erected portion 273 of a lower support member 270 is press-fitted into a thick portion 252b of a cup-shaped member 250, an upper support member 280 with a base portion 281 facing downward is used, and no cushion material is used. Note that a side wall portion 282 of the upper support member 280 is not required to abut on an inner wall of a filter 290 or may abut on the inner wall.

Figure 8B:
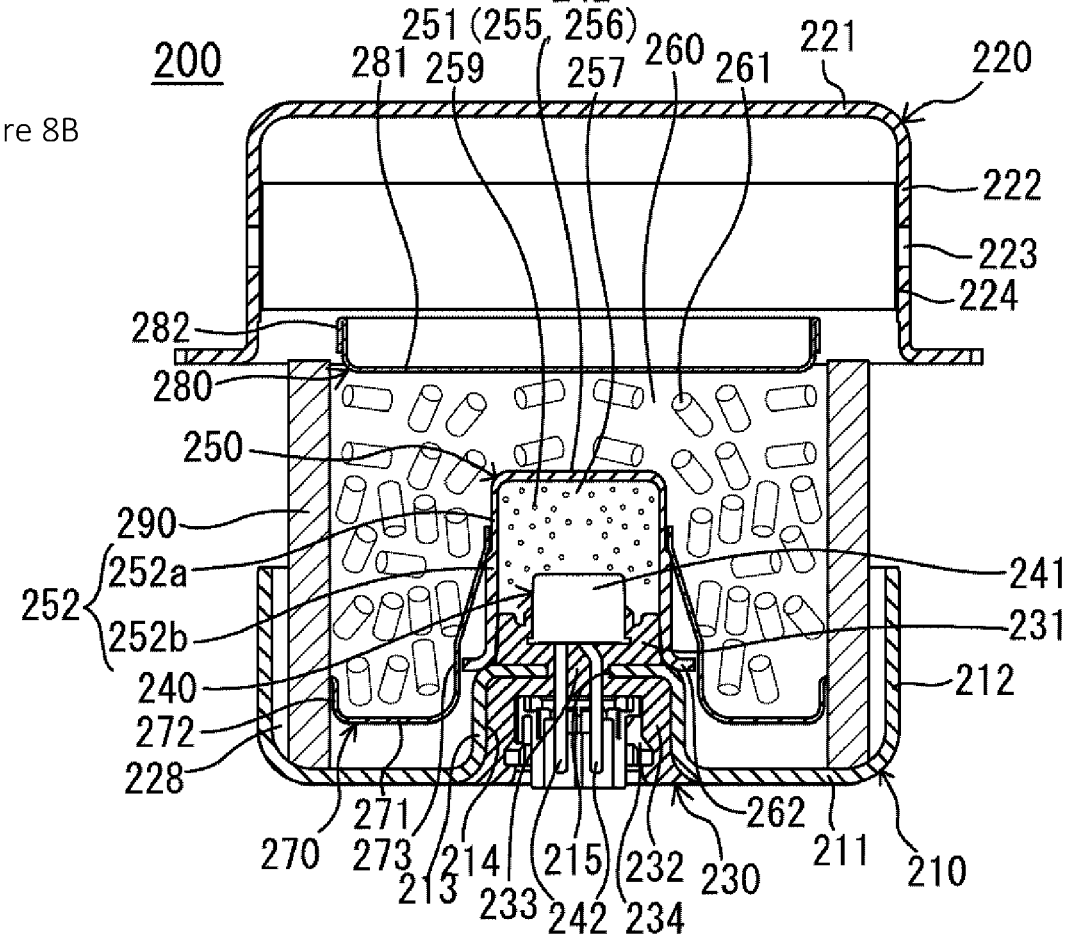

Here, FIG. 8(b) shows one step (before an upper shell 220 is press-fitted into a lower shell 210) of a manufacturing process of the gas generator of FIG. 8(a). Before the upper shell 220 is press-fitted into the lower shell 210 (before the upper end of the erected portion 273 of the lower support member 270 is press-fitted into the thick portion 252b of the cup-shaped member 250), a relationship of an outer diameter of the thin portion 252a≤an inner diameter of the upper end of the erected portion 273 of the lower support member 270<an outer diameter of the thick portion 252b is established. Therefore, FIG. 8(b) shows a state in which the upper end portion of the erected portion 273 of the lower support member 270 is fitted to the thin portion 252a of the cup-shaped member 250, but is stopped at an upper end of the thick portion 252b so as not to naturally move downward from the upper end of the thick portion 252b. As a result, it is possible to prevent the lower support member 270 from being provided obliquely or from moving in the radial direction during the manufacturing process, and thus, it is possible to smoothly fill a gas generator 200 with a gas generating agent 261.

As shown in FIG. 8(b), when the gas generator 200 is filled with the gas generating agent 261 and the upper shell 220 is press-fitted into the lower shell 210, the upper end of the erected portion 273 of the lower support member 270 is press-fitted and fixed to the thick portion 252b of the cup-shaped member 250 via the gas generating agent 261 pushed by the upper support member 280. As a result, the gas generating agent 261 is fixed in a space surrounded by the lower support member 270, the upper support member 280, and the filter 290. Furthermore, the lower support member 270, which is press-fitted and fixed to the thick portion 252b of the cup-shaped member 250, does not move inside the gas generator 200 when the gas generator 200 vibrates.

Therefore, in this modification, not only similar effects to the effects of the embodiment are obtained, but also the cushion material does not need to be used, and the number of parts can be reduced as compared with the embodiment. In addition, since the lower support member 270 does not need to be fixed in advance, and the above-described press-fitting and fixing are performed when the upper shell 220 is press-fitted into the lower shell 210, the cost can be reduced by simplifying the manufacturing process.

Figure 9A:
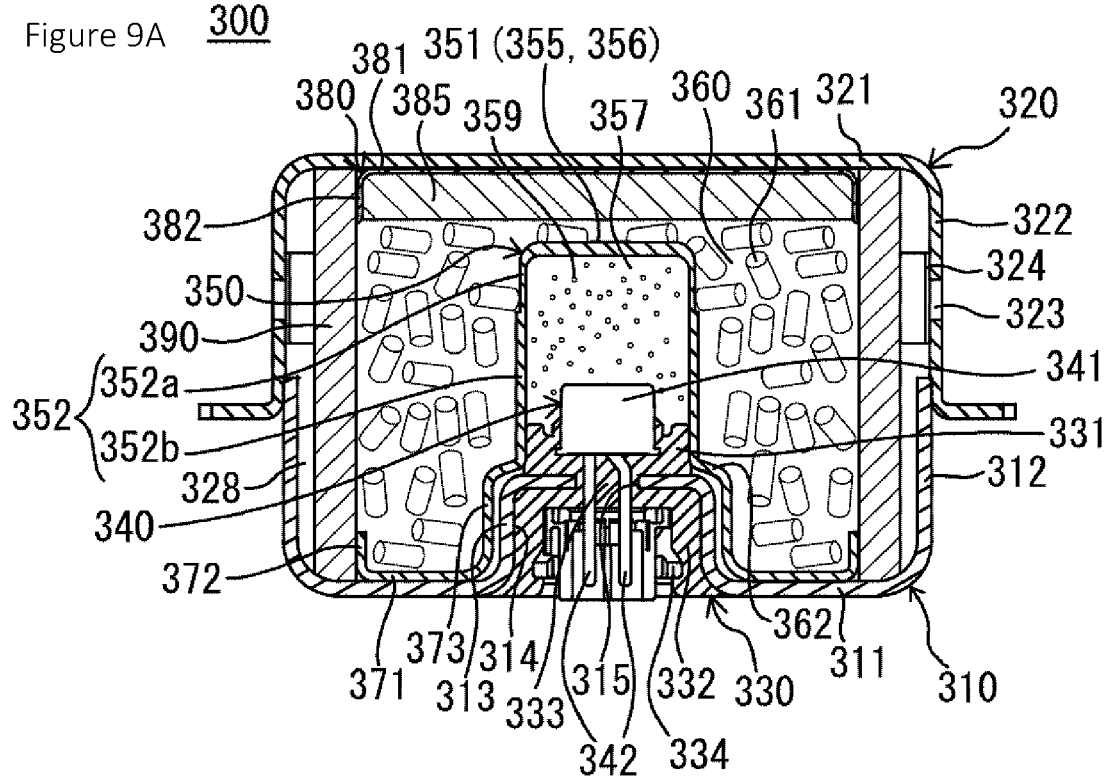
FIG. 9 is a schematic sectional view of a gas generator according to a modification of the embodiment of the present invention.
Figure 9B:
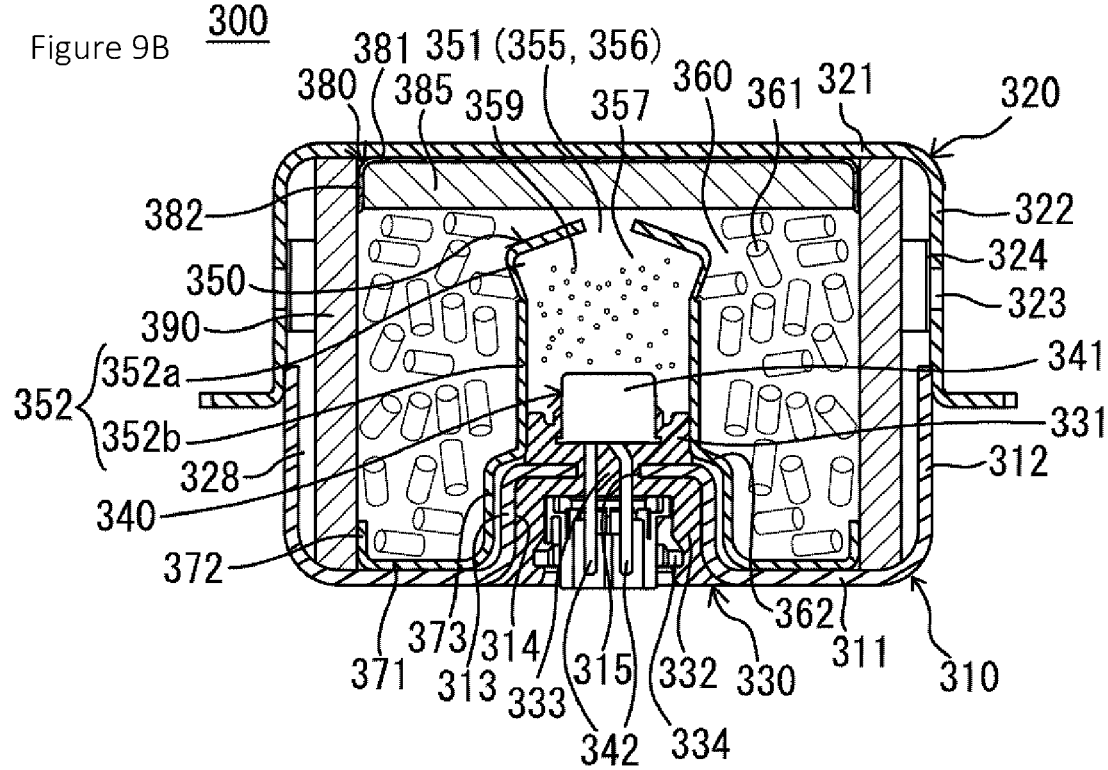
Figure 10A:
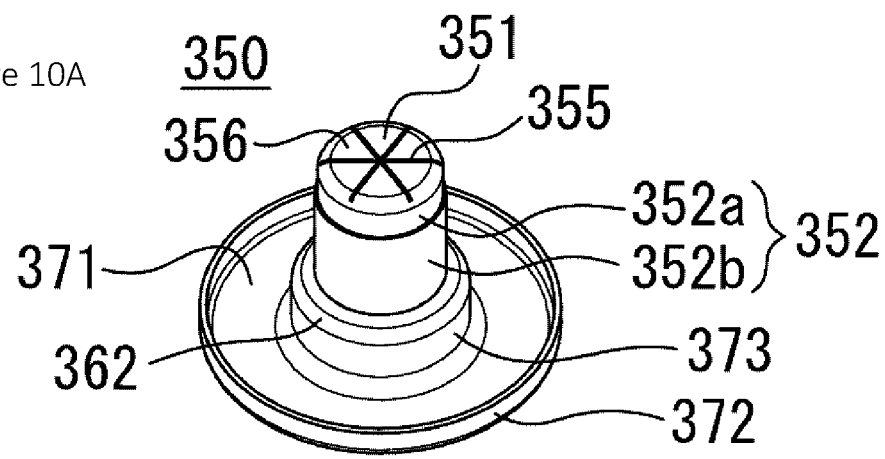
FIG. 10 is a perspective view of a cup-shaped member according to each modification of the embodiment of the present invention.

Next, the gas generator shown in FIG. 9 will be described. A gas generator 300 is different from the above embodiment in that a cup-shaped member 350 is used instead of the cup-shaped member 50 and the lower support member 70. Here, a perspective view of the cup-shaped member 350 is shown in FIG. 10(a).

In the cup-shaped member 350, an erected portion 373, a base portion 371, and an abutment portion 372 corresponding to the lower support member 70 according to the embodiment are sequentially and integrally extended from a flange 362 of the cup-shaped member 50 so as to have the functions of the cup-shaped member 350 and the lower support member 70 according to the embodiment. The cup-shaped member 350 is fixed to an inner cover 331 and a gas generating agent 361 filled in a filter 390. As a result, as shown in FIG. 9(b), in the cup-shaped member 350, a weak member 355 and a thin portion 352a sequentially rupture, deform, or melt at the time of activation as in the embodiment, and a large amount of heat particles generated by the combustion of an enhance agent 359 flows into a combustion chamber 360 at an early stage.

In this modification, not only functions and effects similar to the functions and effects of the embodiment are obtained, but also the cup-shaped member 350 can be fixed together with the inner cover 331 with the gas generating agent 361 before the activation as compared with the embodiment, and after the activation, the movement of the cup-shaped member 350 in the axial direction of the housing of the gas generator 300 (a vertical direction of the sheet of FIG. 9) can be further prevented by the abutment portion 372 together with the inner cover 331. In this modification, since the cup-shaped member 50 and the lower support member 70 according to the embodiment are integrated with each other to constitute the cup-shaped member 350, the number of parts can be reduced as compared with the embodiment.

Figure 10B:
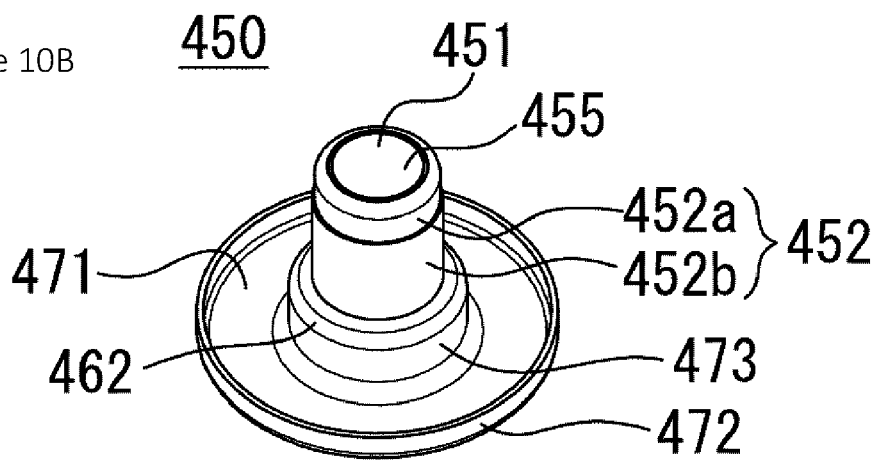

Next, the gas generator shown in FIG. 11 will be described. A gas generator 400 includes a cup-shaped member shown in FIG. 10(b), and is different from the above embodiment in that a cup-shaped member 450 is used instead of the cup-shaped member 50 and the lower support member 70. Here, a perspective view of the cup-shaped member 450 is shown in FIG. 10(b).

The cup-shaped member 450 has a top wall portion 451 instead of a top wall portion 351 of the cup-shaped member 350 of the above modification. The top wall portion 451 is provided with a weak member 455 having a substantially circular shape and having a smaller thickness than a periphery of the weak member 455. The cup-shaped member 450 is fixed to an inner cover 431 and a gas generating agent 361 filled in a filter 490. As a result, as shown in FIG. 11(b), in the cup-shaped member 450, at the time of activation, the weak member 455 (and a thin portion 452a, depending on the type and the filling amount of an enhance agent 459 and/or a degree of the thickness of the thin portion 452a) ruptures, deforms, or melts, and a large amount of heat particles generated by combustion of the enhance agent 459 flows into a combustion chamber 460 at an early stage.

In this modification, not only functions and effects similar to the functions and effects of the embodiment are obtained, but also the cup-shaped member 450 can be fixed together with the inner cover 431 with a gas generating agent 461 before the activation as compared with the embodiment, and after the activation, the movement of the cup-shaped member 450 in the axial direction of the housing of the gas generator 400 (a vertical direction of the sheet of FIG. 11) can be further prevented by the abutment portion 372 together with the inner cover 331. In this modification, since the cup-shaped member 50 and the lower support member 70 according to the embodiment are integrated with each other to constitute the cup-shaped member 450, the number of parts can be reduced as compared with the embodiment.

Figure 10C:
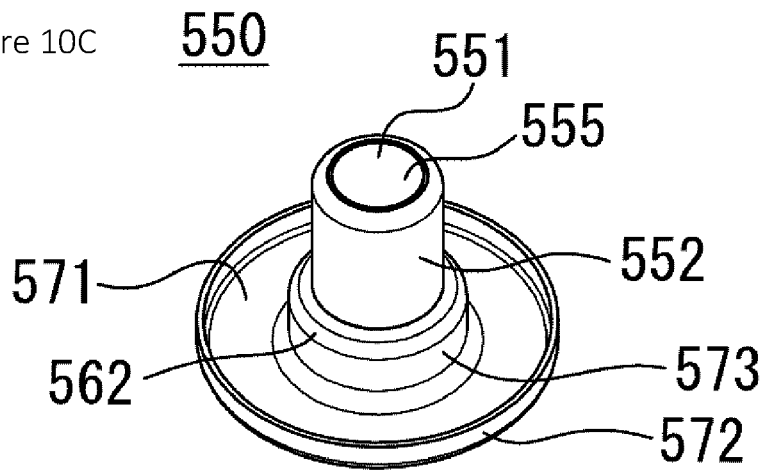
Figure 11A:
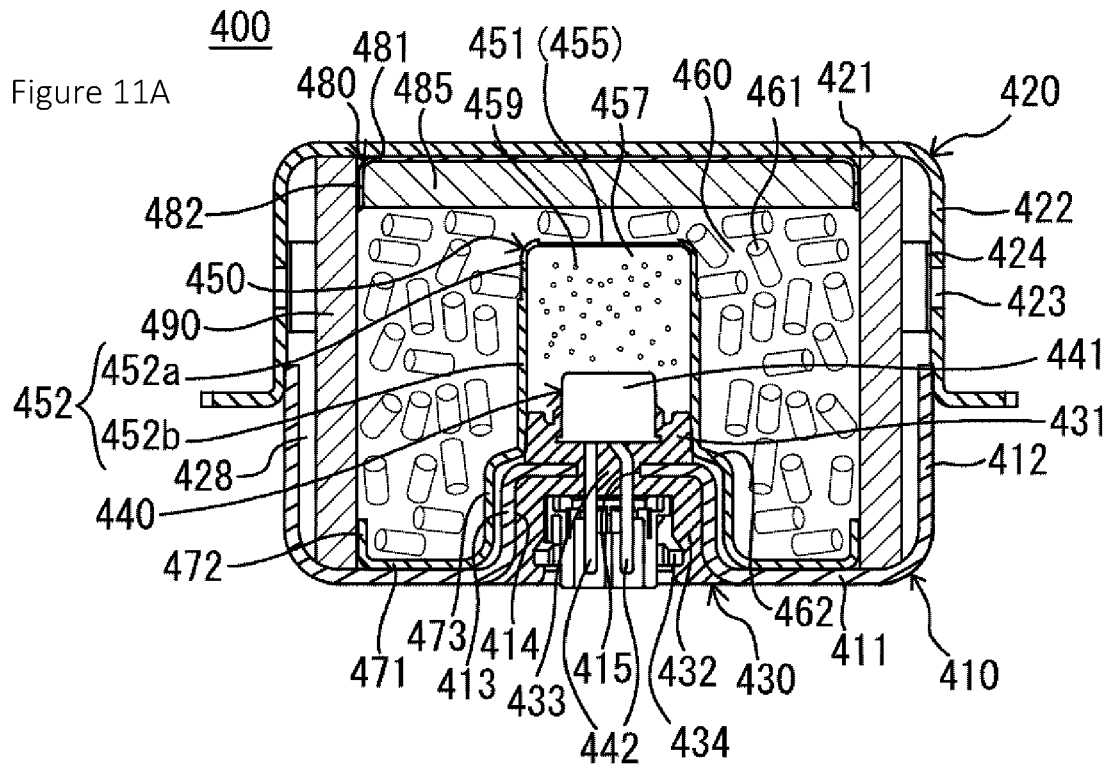
FIG. 11 is a schematic sectional view of a gas generator according to a modification of the embodiment of the present invention.
Figure 11B:
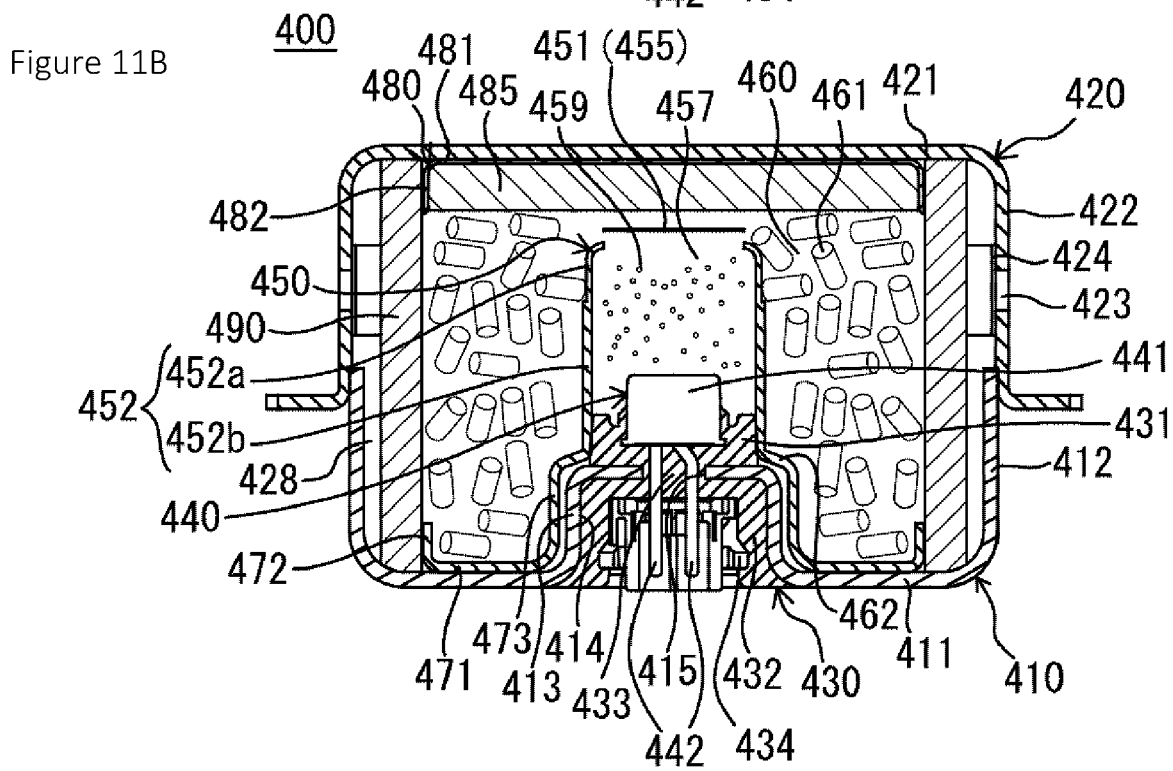

Instead of the cup-shaped member 450 in the gas generator of FIG. 11, a cup-shaped member 550 (see FIG. 10(c)) in which a portion corresponding to the thin portion 452a is not provided in a side wall portion 552 may be used.

In addition, the characteristic configurations described in the embodiment of the present invention and the modifications of the embodiment can be naturally combined with each other within an allowable range in light of the gist of the present invention.

As described above, the embodiment and the modifications of the embodiment disclosed herein are illustrative in all respects and are not restrictive. The technical scope of the present invention is defined by the claims, and includes meanings equivalent to the claims and all modifications within the scope of the claims.

REFERENCE SIGNS LIST 10, 210, 310, 410 lower shell
11, 211, 311, 411 bottom plate portion
12, 212, 312, 412 circumferential wall portion
13, 213, 313, 413 protruding cylindrical portion
14, 214, 314, 414 recess
15, 215, 315, 415 opening
20, 220, 320, 420 upper shell
21, 221, 321, 421 top plate portion
22, 222, 322, 422 circumferential wall portion
23, 223, 323, 423 gas ejection port
24, 224, 324, 424 seal tape
28, 228, 328, 428 gap
30, 230, 330, 430 holder
31, 231, 331, 431 inner cover
32, 232, 332, 432 outer cover
33, 232, 332, 432 coupling portion
34, 234, 334, 434 female connector
40, 240, 340, 440 igniter
41, 241, 341, 441 ignition portion
42, 242, 342, 442 terminal pin
50, 150, 250, 350, 450, 550 cup-shaped member
51, 151, 251, 351, 451, 551 top wall portion
52, 152, 252, 282, 352, 452, 552 side wall portion
52a, 152a, 252a, 352a, 452a thin portion
52b, 152b, 252b, 352b, 452b thick portion
55, 155, 255, 355, 455, 555 weak member
56, 156, 256, 356 non-weak member
57, 257, 357, 457 enhancer chamber
59, 259, 359, 459 enhance agent
60, 260, 360, 460 combustion chamber
61, 261, 361, 461 gas generating agent
62, 162, 262, 362, 462, 562 flange
70, 270 lower support member
71, 81, 271, 371, 471, 281, 381, 481, 571 base portion
72, 82, 272, 372, 472, 382, 482, 572 abutment portion
73, 273, 373, 473, 573 erected portion
80, 280, 380, 480 upper support member
85, 385, 485 cushion material
90, 290, 390, 490 filter
100, 200, 300, 400 disk-type gas generator
151a weak member existing region
151b weak member non-existing region

The invention claimed is:

1. A gas generator comprising:
a housing having a short cylindrical shape, including a cylindrical circumferential wall portion provided with a gas ejection port, a top plate portion that closes one end in an axial direction of the cylindrical circumferential wall portion, and a bottom plate portion that closes another end in the axial direction of the cylindrical circumferential wall portion, and including a combustion chamber that accommodates a gas generating agent inside;
an igniter that is assembled to the bottom plate portion and includes an ignition portion accommodating an ignition charge that ignites at the time of activation; and
a cup-shaped member including an enhancer chamber that accommodates an enhance agent inside, disposed to protrude toward the combustion chamber such that a space inside the enhancer chamber faces the ignition portion, and including a single bottomed cylindrical member, wherein
a thin weak member is disposed on at least a part of a top wall portion of the cup-shaped member,
a side wall portion of the cup-shaped member is provided, the side wall portion,
includes a thin portion provided close to the top wall portion, and a thick portion extending from the thin portion to a side opposite to the top wall portion along the axial direction,
said thin portion and said thick portion of the side wall portion having a mechanical strength higher than a mechanical strength of the weak member partitioning the enhancer chamber and the combustion chamber,
the weak member is disposed to face the ignition portion and has a mechanical strength to rupture, deform, or melt the cup-shaped member prior to the thin portion of the side wall portion in accordance with activation of the igniter, and
the thin portion has a mechanical strength to rupture, deform, or melt when rupture, deformation, or melting in the weak member progresses to the thin portion.

2. The gas generator according to claim 1, wherein the weak member disposed on the top wall portion of the cup-shaped member is thinner than the side wall portion of the cup-shaped member.

3. The gas generator according to claim 1 wherein the top wall portion of the cup-shaped member includes a weak member existing region where rupture, deformation, or melting initially occurs with the weak member as a starting point due to combustion of the enhance agent along with activation of the igniter, and a weak member non-existing region where rupture, deformation, or melting occurs after a lapse of a predetermined time after the weak member existing region deforms.

4. The gas generator according to claim 1, wherein the weak member has a slit shape provided radially from a center on the top wall portion.

5. The gas generator according to claim 1, wherein the cup-shaped member includes metal or an alloy.

6. The gas generator according to claim 1, further comprising:
a filter provided inside the housing over a circumferential direction of the housing; and
a support member including a base portion having an annular plate shape and provided in a direction along an inner bottom surface of the bottom plate portion, an abutment portion abutting on an inner peripheral surface of an end of the filter close to the bottom plate portion, and an erected portion having a cylindrical shape and erected from the base portion toward the top plate portion, wherein the support member is held by the cup-shaped member by press-fitting the erected portion into the thick portion of the cup-shaped member.

7. The gas generator according to claim 1, further comprising a filter provided inside the housing over a circumferential direction of the housing, wherein
the cup-shaped member further includes a base portion having an annular plate shape and provided in a direction along an inner bottom surface of the bottom plate portion, an abutment portion abutting on an inner peripheral surface of an end of the filter close to the bottom plate portion, and an erected portion having a cylindrical shape and erected from the base portion toward the top plate portion, and the erected portion is integrally extended from the side wall portion of the cup-shaped member.

* * * * *